United States Patent
Ogi et al.

(10) Patent No.: US 12,440,181 B2
(45) Date of Patent: Oct. 14, 2025

(54) RADIATION IRRADIATION DEVICE

(71) Applicant: FUJIFILM Corporation, Tokyo (JP)

(72) Inventors: Kazuyuki Ogi, Kanagawa (JP); Takeyasu Kobayashi, Kanagawa (JP); Naoyuki Nishino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 18/544,897

(22) Filed: Dec. 19, 2023

(65) Prior Publication Data
US 2024/0206840 A1 Jun. 27, 2024

(30) Foreign Application Priority Data
Dec. 27, 2022 (JP) ................................. 2022-210696

(51) Int. Cl.
*A61B 6/00* (2024.01)

(52) U.S. Cl.
CPC ................ *A61B 6/548* (2013.01); *A61B 6/56* (2013.01)

(58) Field of Classification Search
CPC .. A61B 6/548; A61B 6/54; A61B 6/56; A61B 5/0002; A61B 6/566; A61B 8/56; A61B 2090/3762; A61B 6/42; A61B 5/0022; A61B 6/00; A61B 6/46
See application file for complete search history.

(56) References Cited

U.S. PATENT DOCUMENTS

| | | | |
|---|---|---|---|
| 11,504,187 B2 * | 11/2022 | Walker | A61B 6/12 |
| 2007/0116180 A1 | 5/2007 | Omernick et al. | |
| 2018/0116624 A1 | 5/2018 | Tobita et al. | |
| 2018/0153499 A1 | 6/2018 | Tobita et al. | |
| 2019/0000411 A1 | 1/2019 | Kim | |
| 2019/0380664 A1 | 12/2019 | Nariyuki et al. | |
| 2019/0380671 A1 | 12/2019 | Sato et al. | |

FOREIGN PATENT DOCUMENTS

WO 2018/159011 A1 9/2018

OTHER PUBLICATIONS

The extended European search report issued by the European Patent Office on Feb. 13, 2024, which corresponds to European Patent Application No. 23218284.0-1126 and is related to U.S. Appl. No. 18/544,897.

* cited by examiner

*Primary Examiner* — Don K Wong
(74) *Attorney, Agent, or Firm* — Studebaker Brackett PLLC

(57) ABSTRACT

A radiation irradiation device includes a device main body that emits radiation; a remote operation unit that is capable of remotely operating the device main body and is attachable to and detachable from the device main body; and a processor, in which the processor is configured to detect an attachment/detachment state of the remote operation unit with respect to the device main body, and execute a control of an operation of the device main body according to the detected attachment/detachment state.

12 Claims, 13 Drawing Sheets

FIG.7
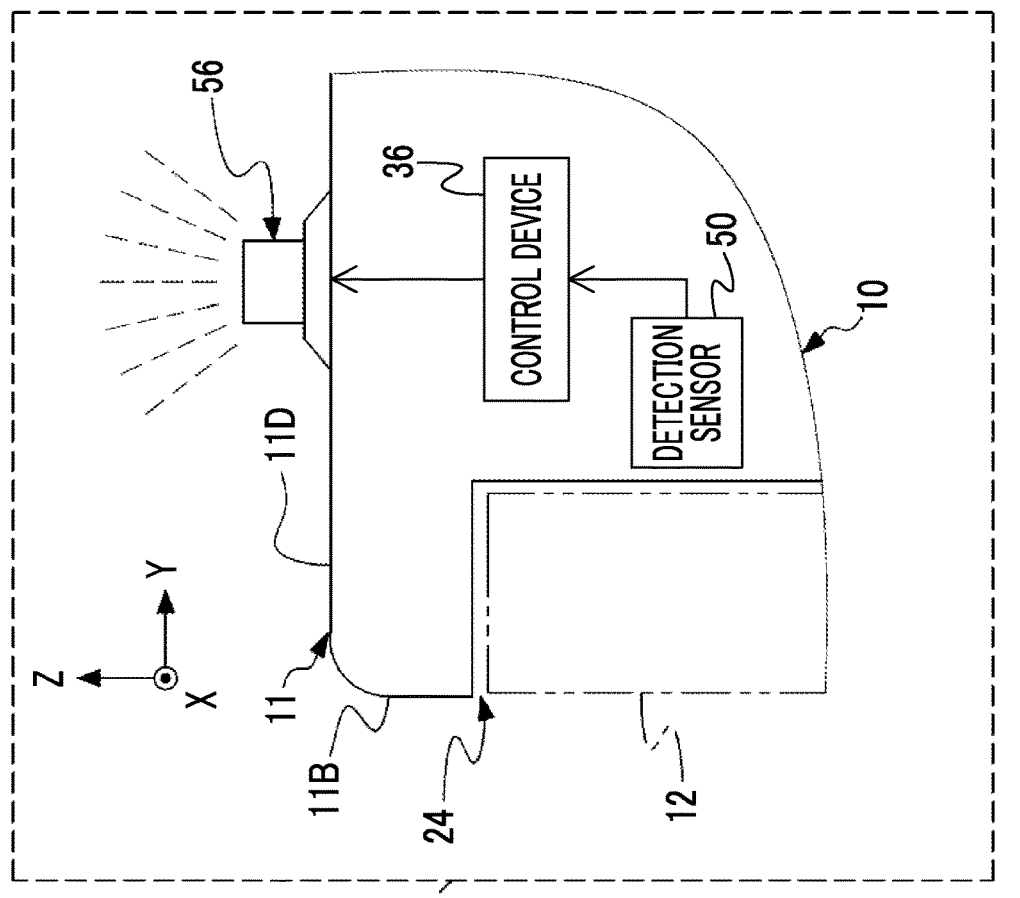
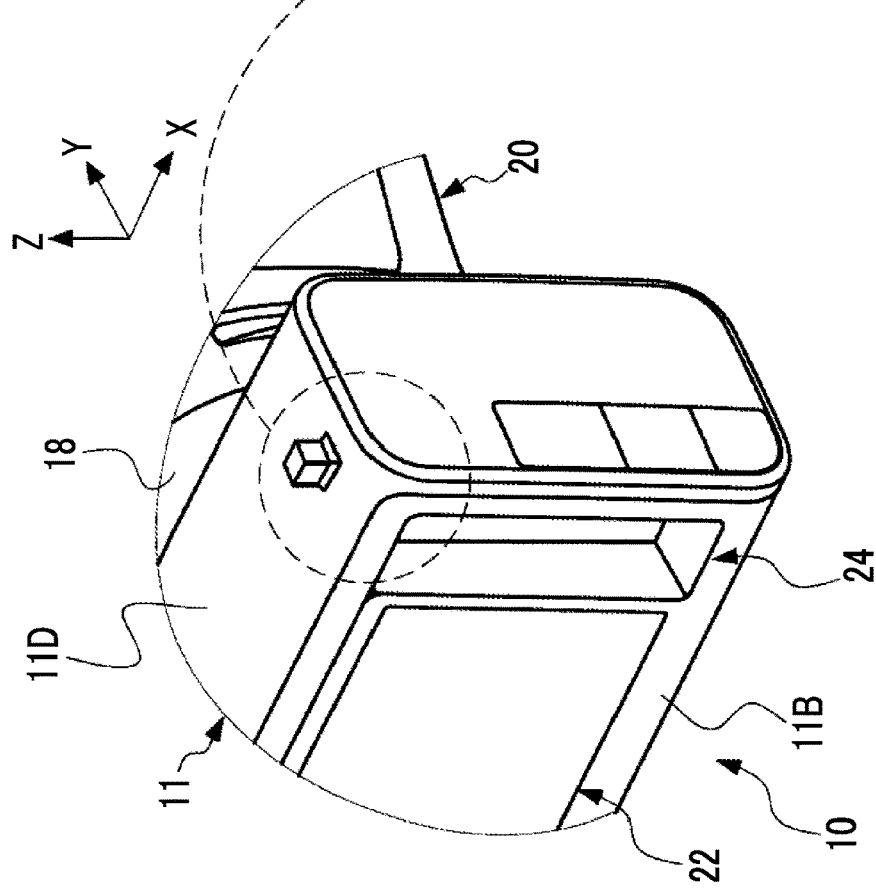

RADIATION IRRADIATION DEVICE

CROSS-REFERENCE TO RELATED APPLICATION

This application claims priority from Japanese Patent Application No. 2022-210696, filed Dec. 27, 2022, the disclosure of which is incorporated herein by reference in its entirety.

BACKGROUND

Technical Field

The present disclosure relates to a radiation irradiation device.

Related Art

WO2018/159011A discloses a radiation irradiation device comprising a radiation generation unit that generates radiation, and a switch unit that controls emission of the radiation from the radiation generation unit. The radiation generation unit and the switch unit are composed of separate housings, and the radiation generation unit and the switch unit are configured to be attachable and detachable via a partial surface of each housing.

In this radiation irradiation device, it may be necessary for a user to perform work of checking an attachment/detachment state of a remote operation unit (switch unit in WO2018/159011A). For example, in order to prevent the remote operation unit from being lost, it is necessary to check that the remote operation unit is attached to a device main body before turning off a power of the radiation irradiation device. However, in handling the radiation irradiation device, the work of the user depending on the attachment/detachment state of the remote operation unit is a burden on the user.

SUMMARY

The technology of the present disclosure provides a radiation irradiation device that can reduce the need to perform work depending on the attachment/detachment state of the remote operation unit and improve convenience.

A first aspect according to the technology of the present disclosure is a radiation irradiation device comprising: a device main body that emits radiation; a remote operation unit that is capable of remotely operating the device main body and is attachable to and detachable from the device main body; and a processor, in which the processor is configured to: detect an attachment/detachment state of the remote operation unit with respect to the device main body; and execute a control of an operation of the device main body according to the detected attachment/detachment state.

A second aspect according to the technology of the present disclosure is the radiation irradiation device according to the first aspect, in which the device main body includes a notification unit that gives a notification to a user, and the control includes causing the notification unit to give a notification regarding the attachment/detachment state.

A third aspect according to the technology of the present disclosure is the radiation irradiation device according to the second aspect, in which the control includes causing the notification unit to give a notification that the remote operation unit is not attached to the device main body in a case where an operation of stopping at least a part of functions of the device main body is performed in a state in which the remote operation unit is detached from the device main body.

A fourth aspect according to the technology of the present disclosure is the radiation irradiation device according to the third aspect, in which the operation of stopping at least a part of the functions of the device main body is an operation of turning off a power of the device main body.

A fifth aspect according to the technology of the present disclosure is the radiation irradiation device according to the second aspect, in which in a case where a surface of the device main body on which an irradiation window for emitting the radiation is provided is assumed as a front surface, the notification unit is a display provided on a rear surface which is a surface of the device main body opposite to the front surface.

A sixth aspect according to the technology of the present disclosure is the radiation irradiation device according to the second aspect, in which the notification unit is a display lamp that protrudes outward from an outer peripheral surface of the device main body.

A seventh aspect according to the technology of the present disclosure is the radiation irradiation device according to the first aspect, in which in a case where pairing for causing the device main body and the remote operation unit to be recognized as communication partners is necessary prior to wireless communication, the control includes starting the pairing in a case where it is determined that the remote operation unit is attached to the device main body.

An eighth aspect according to the technology of the present disclosure is the radiation irradiation device according to the first aspect, in which the processor is configured to, in a case where an irradiation start instruction that is an instruction to start irradiation with the radiation is input from the remote operation unit, execute, as the control, a control related to the irradiation.

A ninth aspect according to the technology of the present disclosure is the radiation irradiation device according to the eighth aspect, in which the control related to the irradiation includes prohibiting the irradiation with the radiation by the device main body or issuing a warning as to whether the irradiation with the radiation is allowed in a case where the remote operation unit is attached to the device main body.

A tenth aspect according to the technology of the present disclosure is the radiation irradiation device according to the eighth aspect, in which the control related to the irradiation includes permitting the irradiation with the radiation by the device main body in a case where the remote operation unit is detached from the device main body.

An eleventh aspect according to the technology of the present disclosure is the radiation irradiation device according to the first aspect, in which the control includes starting preparation for irradiation with the radiation in a case where the remote operation unit is detached from the device main body.

A twelfth aspect according to the technology of the present disclosure is the radiation irradiation device according to the first aspect, in which the processor is configured to: derive a communication distance between the remote operation unit and the device main body based on a signal intensity received from the remote operation unit through wireless communication; and detect the attachment/detachment state based on the derived communication distance.

The technology of the present disclosure provides a radiation irradiation device that can reduce the need to perform work depending on the attachment/detachment state of the remote operation unit and improve convenience.

BRIEF DESCRIPTION OF THE DRAWINGS

FIG. 7 is a conceptual diagram showing an example of an aspect of a notification of an attachment/detachment state by a display lamp.

DETAILED DESCRIPTION

Hereinafter, an embodiment of the present disclosure will be described in detail with reference to the drawings.

In the following description, for convenience of explanation, a height direction, a width direction, and a front-rear direction (also referred to as a depth direction) of a radiation irradiation device 10 are indicated by three arrows X, Y, and Z. First, the height direction is indicated by the arrow Z, an arrow Z direction pointed by the arrow Z is an upward direction of the radiation irradiation device 10, and an opposite direction of the upward direction is a downward direction. The height direction is a vertical direction. The width direction is indicated by the arrow X orthogonal to the arrow Z, a direction pointed by the arrow X is a right direction of the radiation irradiation device 10, and an opposite direction of the right direction is a left direction. The front-rear direction is indicated by the arrow Y orthogonal to the arrow Z and the arrow X, a direction pointed by the arrow Y is a front direction of the radiation irradiation device 10, and an opposite direction of the front direction is a rear direction. That is, in the radiation irradiation device 10, an emission direction of the radiation is the front direction, and a side on which a subject A stands (see FIG. 1) is the front direction. In addition, in the following, expressions using sides such as an upper side, a lower side, a left side, a right side, a front side, and a rear side have the same meanings as the expressions using the directions.

In the present embodiment, a "vertical direction" refers not only to a perfect vertical direction but also to a vertical direction in the sense of including an error that is generally acceptable in the technical field to which the technology of the present disclosure belongs and that does not contradict the concept of the technology of the present disclosure. The same applies to a "horizontal direction". The "horizontal direction" refers not only to a perfect horizontal direction but also to a horizontal direction in the sense of including an error that is generally acceptable in the technical field to which the technology of the present disclosure belongs and that does not contradict the concept of the technology of the present disclosure.

First Embodiment

Figure 1:
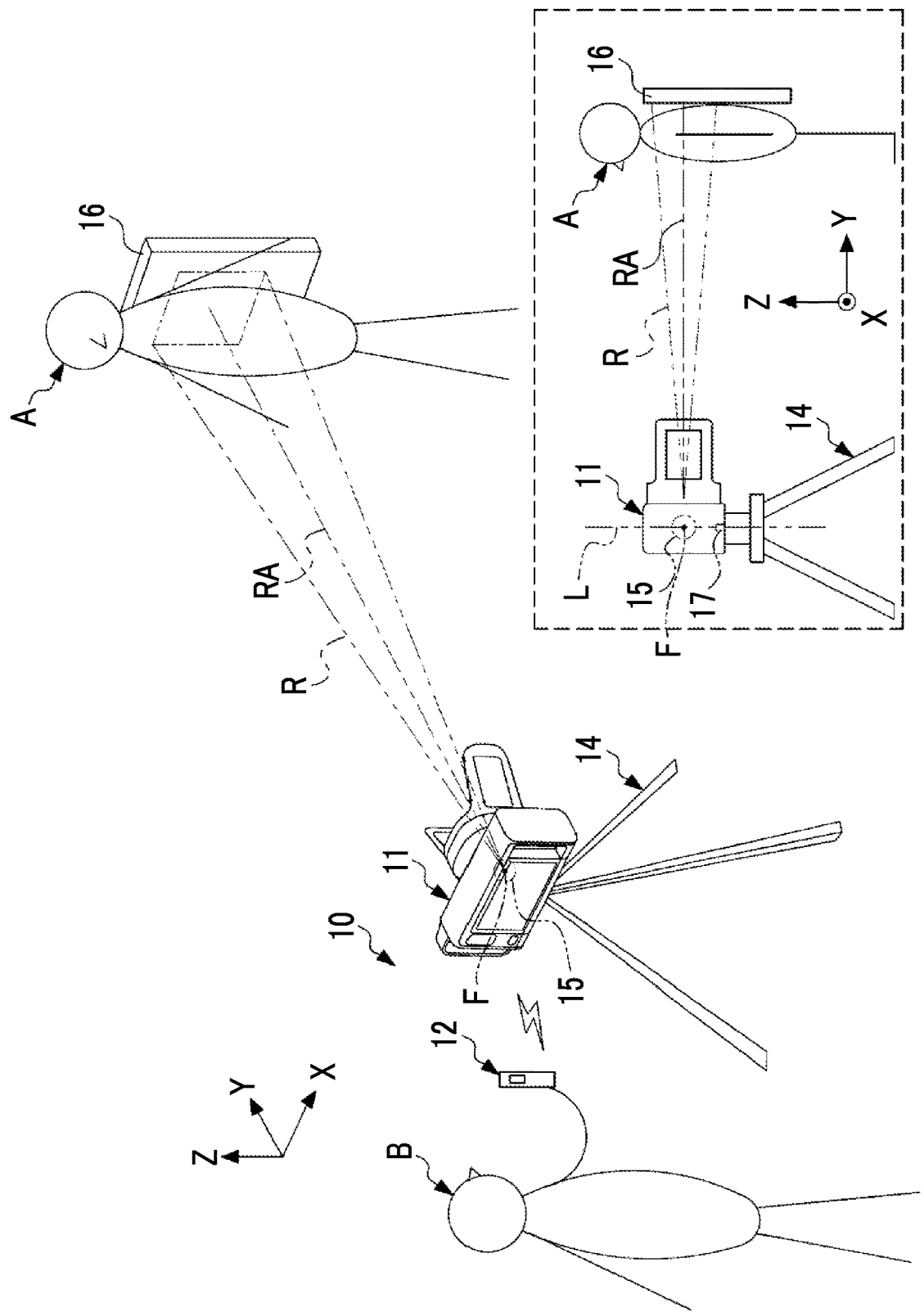
FIG. 1 is a perspective view showing an example of a usage state of a radiation irradiation device.

As shown in FIG. 1 as an example, the radiation irradiation device 10 comprises a device main body 11 and a remote operation unit 12. The device main body 11 is a device that can irradiate the subject A with radiation R. The device main body 11 comprises a radiation tube 15, which is a generation source of the radiation, inside thereof and emits the radiation (for example, X-rays or γ-rays) generated in the radiation tube 15 toward the subject A via an irradiation field limiter (see FIG. 3), an irradiation window (see FIG. 3), and the like. The radiation irradiation device 10 is an example of a "radiation irradiation device" according to the technology of the present disclosure, the device main body 11 is an example of a "device main body" according to the technology of the present disclosure, and the remote operation unit 12 is an example of a "remote operation unit" according to the technology of the present disclosure. Here, the term "remote" means separation to the extent caused by physical separation, and does not mean an amount of distance.

The radiation irradiation device 10 has a portable size and weight. That is, the radiation irradiation device 10 is a portable radiation irradiation device. The radiation irradiation device 10 may be used, for example, in a simple radiographic examination at a medical facility or may be used in a radiographic examination during home medical care. In addition, the radiation irradiation device 10 may be used outdoors. For example, the radiation irradiation device 10 may be used for an on-site medical care in a disaster-stricken area or a medically underserved area.

The device main body 11 is set at a predetermined position (for example, height and distance) with respect to the subject A via, for example, a tripod 14. A fixing portion 17 for fixing the tripod 14 and the device main body 11 is provided on a lower surface of the device main body 11. The fixing portion 17 is, for example, a screw hole. The fixing portion 17 is located on a straight line L which is orthogonal to a central axis RA of a flux of the radiation R and passes through a focus F of the radiation tube 15. The radiation tube 15 generates the radiation R, for example, by colliding electrons emitted from a cathode with a target. The focus F is a position where the electrons collide on the target. The flux of the radiation R spreads in a conical shape with the focus F as a base point. The central axis RA is a central axis of such a flux. The fixing portion 17 is provided at a position where the straight line L and the lower surface of the device main body 11 intersect. In the radiation irradiation device 10, a portion in which the focus F of the radiation tube 15 is located is close to a centroid. The fixing portion 17 is provided on the straight line L, which makes it easy to stabilize the radiation irradiation device 10 on the tripod 14.

The remote operation unit 12 is a device that can remotely operate the device main body 11. The remote operation unit 12 is attachable to and detachable from the device main body 11. The remote operation unit 12 remotely operates the device main body 11, for example, by performing wireless communication with the device main body 11. The remote operation by the remote operation unit 12 includes, for example, an operation of causing the device main body 11 to emit the radiation R toward the subject A.

A user B, who is an operator of the radiation irradiation device 10, takes out the remote operation unit 12 from the device main body 11 and then operates the remote operation unit 12 in a state of being separated from the device main body 11 by a predetermined distance. As a result, the radiation R is emitted from the radiation tube 15 of the device main body 11 to the subject A. The radiation R transmitted through the subject A is detected by a detector 16. The detector 16 is, for example, a so-called flat panel detector, has a detection surface on which pixels are two-dimensionally arranged, and outputs an image signal corresponding to an intensity of the radiation R incident on each pixel. The radiation R is transmitted through the subject A to carry information regarding a body tissue of the subject A. The detector 16 detects the radiation R in each pixel of the detection surface to output an image signal representing a projection image of the body tissue of the subject A as a radiation image.

Further, the user B accommodates the remote operation unit 12 in the device main body 11 after completing imaging using the radiation irradiation device 10. In a state in which the remote operation unit 12 is accommodated in the device main body 11, the radiation irradiation device 10 is carried by the user B or is stored in a storage case of the radiation irradiation device 10.

Figure 2:
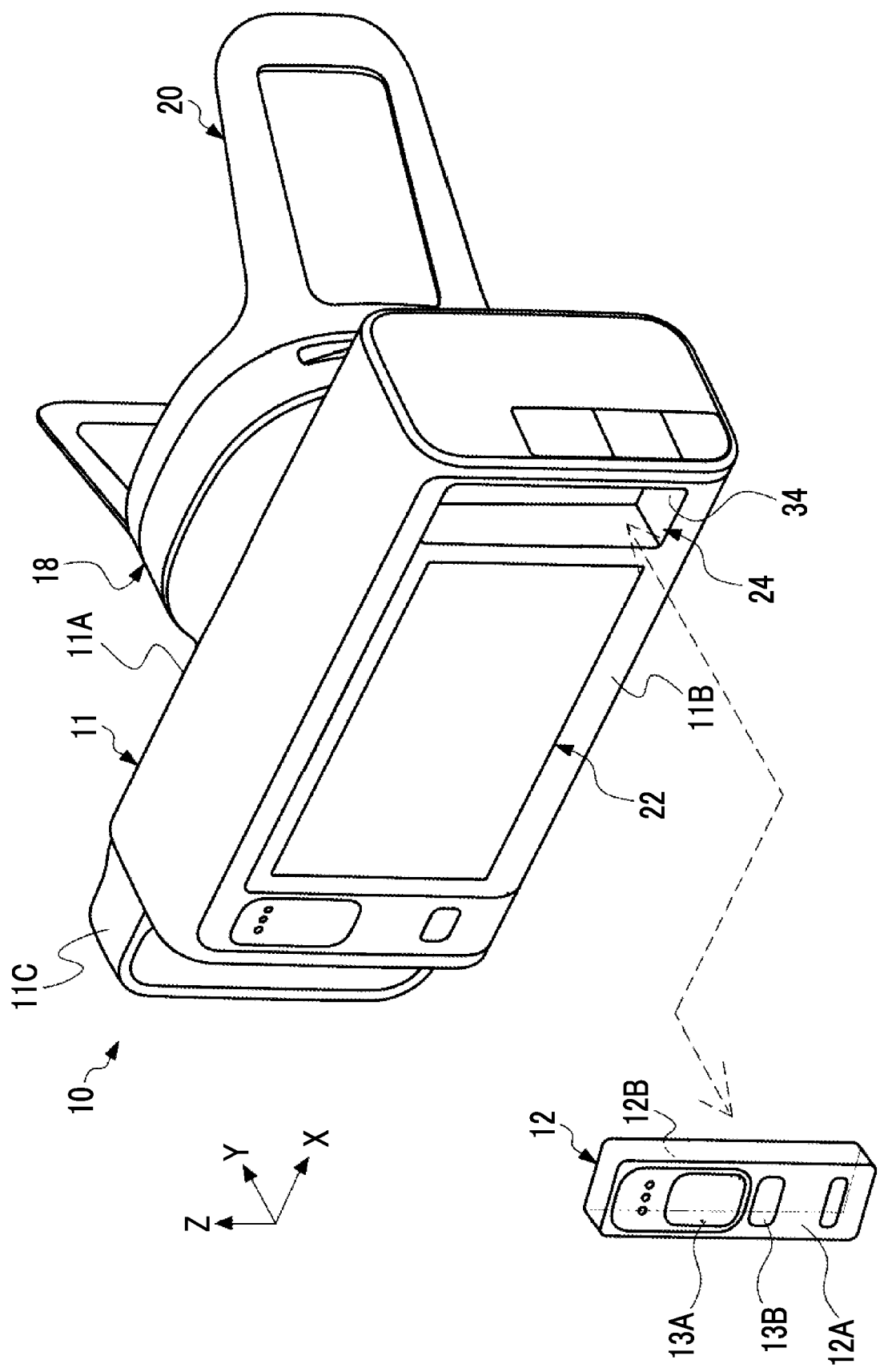
FIG. 2 is an external perspective view showing an example of a configuration of the radiation irradiation device.

As shown in FIG. 2 as an example, the device main body 11 has a substantially rectangular parallelepiped shape having a longitudinal direction in a left-right direction. A tubular portion 18 that protrudes toward an emission direction of the radiation R is provided on a front surface 11A of the device main body 11. The front surface 11A is an example of a "front surface" according to the technology of the present disclosure. The irradiation field limiter (also called a collimator) and the irradiation window, which will be described later, are attached inside the tubular portion 18. Further, a skin guard 20 is attached to a distal end of the tubular portion 18. The skin guard 20 is used to ensure a necessary space between the device main body 11 and the subject A, and prevents the subject A from being irradiated with the radiation R in a state in which the device main body 11 is too close to the subject A.

An accommodation portion 24 is provided on a rear surface 11B of the device main body 11. The accommodation portion 24 can attachably and detachably accommodate the remote operation unit 12 in the rear surface 11B of the device main body 11. Specifically, the accommodation portion 24 has a recessed inner wall surface 34. In a state in which the remote operation unit 12 is accommodated in the accommodation portion 24, the inner wall surface 34 faces all surfaces of the remote operation unit 12 except for a back surface 12B. As described above, the accommodation portion 24 attachably and detachably accommodates the remote operation unit 12.

A display 22 is provided on the rear surface 11B of the device main body 11. The display 22 displays various types of information related to the radiography. The display 22 may be, for example, a liquid crystal display or may be an electro-luminescence (EL) display. The display 22 is an example of a "notification unit" and a "display" according to the technology of the present disclosure. Further, a grip member 11C is attached to a left side surface of the device main body 11. The user B grips the radiation irradiation device 10 via the grip member 11C.

The remote operation unit 12 has a substantially rectangular parallelepiped shape having a longitudinal direction in an up-down direction in a state of being accommodated in the device main body 11. The remote operation unit 12 has an operation surface 12A and the back surface 12B. An irradiation button 13A and an imaging button 13B are provided on the operation surface 12A.

The irradiation button 13A is an operation button for giving an instruction for the irradiation with the radiation R. In a case where the irradiation button 13A is pressed by the user B, a signal for irradiating with the radiation R is output from the remote operation unit 12 to the device main body 11. In addition, an optical camera 47 (see FIG. 4) is built into the radiation irradiation device 10. The imaging button 13B is an operation button for giving an instruction for imaging by the optical camera 47. In a case where the imaging button 13B is pressed by the user B, a signal for causing the optical camera 47, which will be described later, to perform imaging is output from the remote operation unit 12 to the device main body 11. The back surface 12B is a surface opposite to the operation surface 12A, and operation keys including the irradiation button 13A and the imaging button 13B are not provided on the back surface 12B.

Here, an example in which the irradiation button 13A and the imaging button 13B are buttons has been described, but this is merely an example. The irradiation button 13A and the imaging button 13B may be cursors, slide switches, or touch pads.

Figure 3:
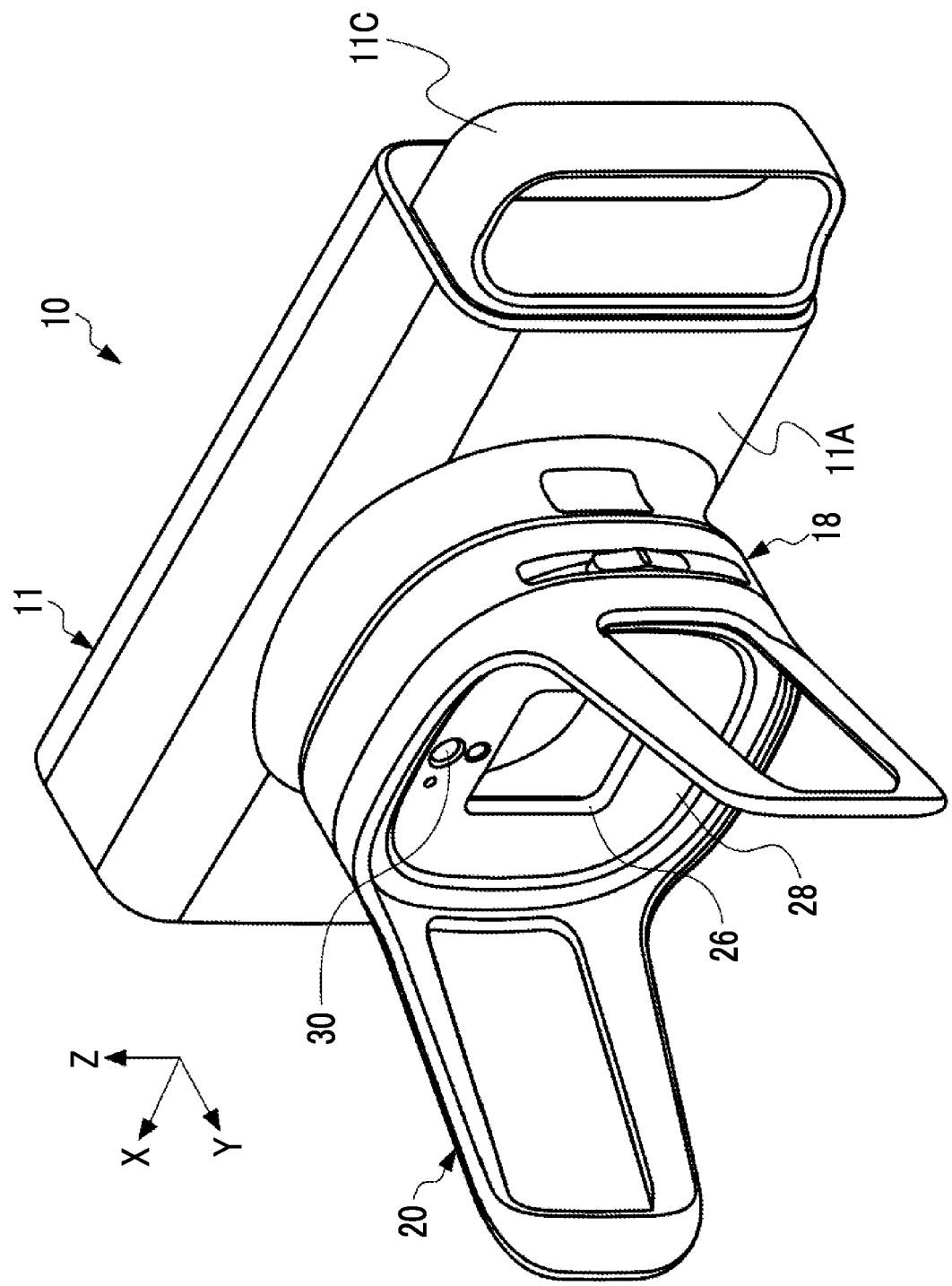
FIG. 3 is an external perspective view showing an example of the configuration of the radiation irradiation device.

As shown in FIG. 3 as an example, the tubular portion 18 protruding from the front surface 11A of the device main body 11 has an irradiation field limiter 26 and an irradiation window 28. The irradiation field limiter 26 is an irradiation field limiter that defines an irradiation range of the radiation R to a predetermined range. In addition, the irradiation window 28 is a window member that is made of a member transparent to the radiation R and partitions an outside and an inside of the tubular portion 18. The radiation R emitted from the radiation tube 15 has an irradiation range defined by the irradiation field limiter 26 and is emitted from the irradiation window toward the subject A. Further, an optical camera 47 (see FIG. 4) is provided in the tubular portion 18. The optical camera 47 is, for example, an imaging device having an image sensor such as a charge coupled device (CCD) image sensor and a complementary metal-oxide-semiconductor (CMOS) image sensor. Reference 30 denotes an imaging window that is a part of a lens of the optical camera 47. Image light of the subject A is incident on the image sensor in the optical camera 47 through the imaging window 30. The optical camera 47 images, for example, the subject A. An optical image of the imaged subject A is used, for example, to perform registration of an irradiation position of the radiation R.

Figure 4:
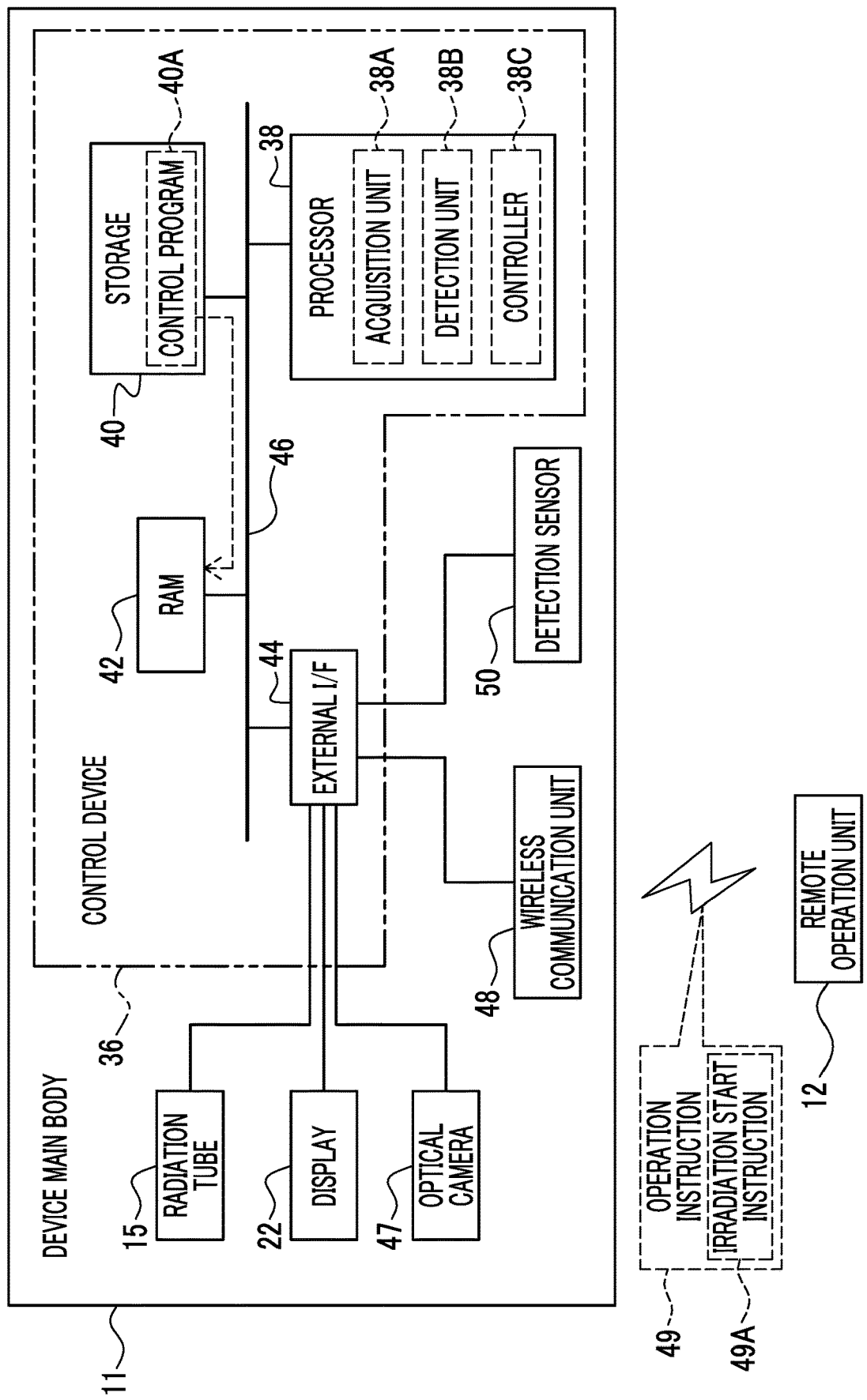
FIG. 4 is a block diagram showing an example of a hardware configuration of an electric system of the radiation irradiation device.

As shown in FIG. 4 as an example, the device main body 11 comprises a control device 36. The control device 36 controls an overall operation of the device main body 11. The control device 36 comprises a processor 38, a storage 40, a random access memory (RAM) 42, and an external interface (I/F) 44. The processor 38, the storage 40, the RAM 42, and the external I/F 44 are connected to a bus 46.

The processor 38 is an example of a "processor" according to the technology of the present disclosure.

A memory is connected to the processor 38. The memory includes the storage 40 and the RAM 42. The processor 38 is, for example, a central processing unit (CPU). The processor 38 may be provided with a graphics processing unit (GPU) dedicated to image processing, separately from the CPU.

The storage 40 is a non-volatile storage device that stores various programs, various parameters, and the like. Examples of the storage 40 include a flash memory (for example, an electrically erasable and programmable read only memory (EEPROM) and a solid state drive (SSD)), and/or a hard disk drive (HDD). The flash memory and the HDD are merely an example, and at least one of the flash memory, the HDD, a magnetoresistive memory, or a ferroelectric memory may be used as the storage 40.

The RAM 42 is a memory in which the information is transitorily stored, and is used as a work memory by the processor 38. Examples of the RAM 42 include a dynamic random access memory (DRAM) and a static random access memory (SRAM).

The external I/F 44 is responsible for exchanging various types of information with devices present outside the control device 36. The external I/F 44 is communicably connected to the radiation tube 15, the display 22, and the optical camera 47. In addition, the external I/F 44 is connected to a wireless communication unit 48 and a detection sensor 50, which are described below.

The device main body 11 comprises the wireless communication unit 48. The wireless communication unit 48 wirelessly communicates information including an operation instruction 49 with the remote operation unit 12. A wireless communication system is, for example, a communication system based on specifications of Bluetooth (registered trademark). The operation instruction 49 refers to an instruction to remotely operate the device main body 11. The operation instruction 49 includes an irradiation start instruction 49A to cause the device main body 11 to start the irradiation with the radiation. As another example, the operation instruction 49 includes an instruction to start imaging by the optical camera 47 and/or an instruction to turn off a power of the device main body 11. The wireless communication unit 48 is hardware that is used to perform wireless communication with the remote operation unit 12 and is a wireless communication interface (I/F). The wireless communication I/F as the wireless communication unit 48 includes, for example, a communication antenna and a transmission/reception circuit.

Here, although Bluetooth (registered trademark) is illustrated as the wireless communication system between the wireless communication unit 48 and the remote operation unit 12, the technology of the present disclosure is not limited thereto. As the first system, Zigbee (registered trademark) or infrared communication may be used.

The device main body 11 comprises the detection sensor 50. The detection sensor 50 outputs a signal corresponding to an attachment/detachment state of the remote operation unit 12. The signal output from the detection sensor 50 is acquired by the processor 38 via the external I/F 44. Details of the detection sensor 50 will be described below.

Meanwhile, in the radiation irradiation device 10, in a case where the radiation irradiation device 10 is stored in the storage case or is carried to another place while the remote operation unit 12 is not accommodated in the accommodation portion 24, the remote operation unit 12 may be lost. Therefore, after using the radiation irradiation device 10, the user needs to check the attachment/detachment state of the remote operation unit 12 with respect to the device main body 11. However, in handling the radiation irradiation device 10, it is a burden on the user to check the attachment/detachment state of the remote operation unit 12.

Therefore, in view of such circumstances, in the radiation irradiation device 10 according to the present embodiment, in the control device 36, the processor 38 reads out a control program 40A from the storage 40 and executes the read-out control program 40A on the RAM 42. Accordingly, the processor 38 operates as an acquisition unit 38A, a detection unit 38B, and a controller 38C.

Figure 5:
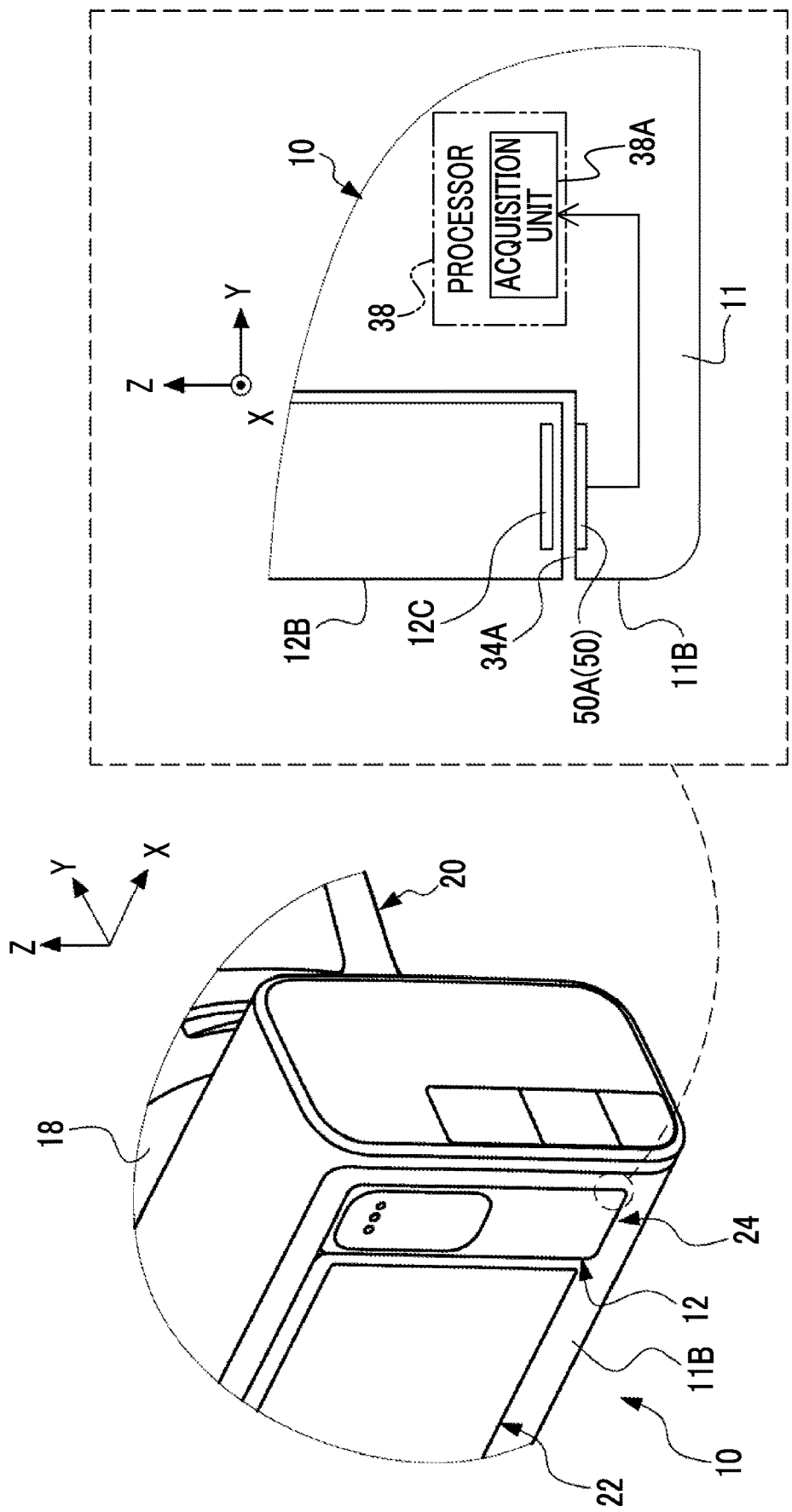
FIG. 5 is a conceptual diagram showing an example of an aspect of an output of a signal corresponding to an attachment/detachment state by a detection sensor.

As shown in FIG. 5 as an example, the acquisition unit 38A acquires a signal output from the detection sensor 50. In the example shown in FIG. 5, the detection sensor 50 is a magnetic force sensor 50A. The magnetic force sensor 50A is a sensor that detects a change in magnetic field, and is provided on a lower surface 34A of the accommodation portion 24 of the device main body 11. Meanwhile, the remote operation unit 12 is provided with a magnetic body 12C. In a state in which the remote operation unit 12 is accommodated in the accommodation portion 24, the magnetic body 12C is provided at a position facing the lower surface 34A. Accordingly, the magnetic force sensor 50A outputs a change in magnetic field caused by the magnetic body 12C accompanying the attachment of the remote operation unit 12 to the device main body 11 as a signal to the acquisition unit 38A.

Although an example of a form in which the detection sensor 50 is provided on the lower surface 34A of the accommodation portion 24 has been described here, this is merely an example. A position where the detection sensor 50 is installed is not particularly limited as long as it is a position where the attachment and detachment of the remote operation unit 12 can be detected. In addition, although an example of a form in which the detection sensor 50 is the magnetic force sensor 50A has been described, this is merely an example. An aspect may be employed in which the detection sensor 50 detects the attachment of the remote operation unit 12 to the accommodation portion 24 by using, for example, an optical sensor such as a photocoupler. Furthermore, an aspect may be employed in which the detection sensor 50 is a mechanical switch such as a microswitch and detects the attachment by the microswitch pressed in a case where the remote operation unit 12 is attached to the accommodation portion 24.

Furthermore, an aspect may be employed in which the detection sensor 50 is an electrical contact provided in the accommodation portion 24 and detects the attachment by ensuring conduction of the electrical contact in a case where the remote operation unit 12 is attached to the accommodation portion 24. In addition, an aspect in which the detection sensor 50 is a light receiving sensor, and in a case where the remote operation unit 12 is attached to the accommodation portion 24, light from an infrared light source provided in the device main body 11 is reflected by the remote operation unit 12, and the light receiving sensor detects the reflected light.

Figure 6:
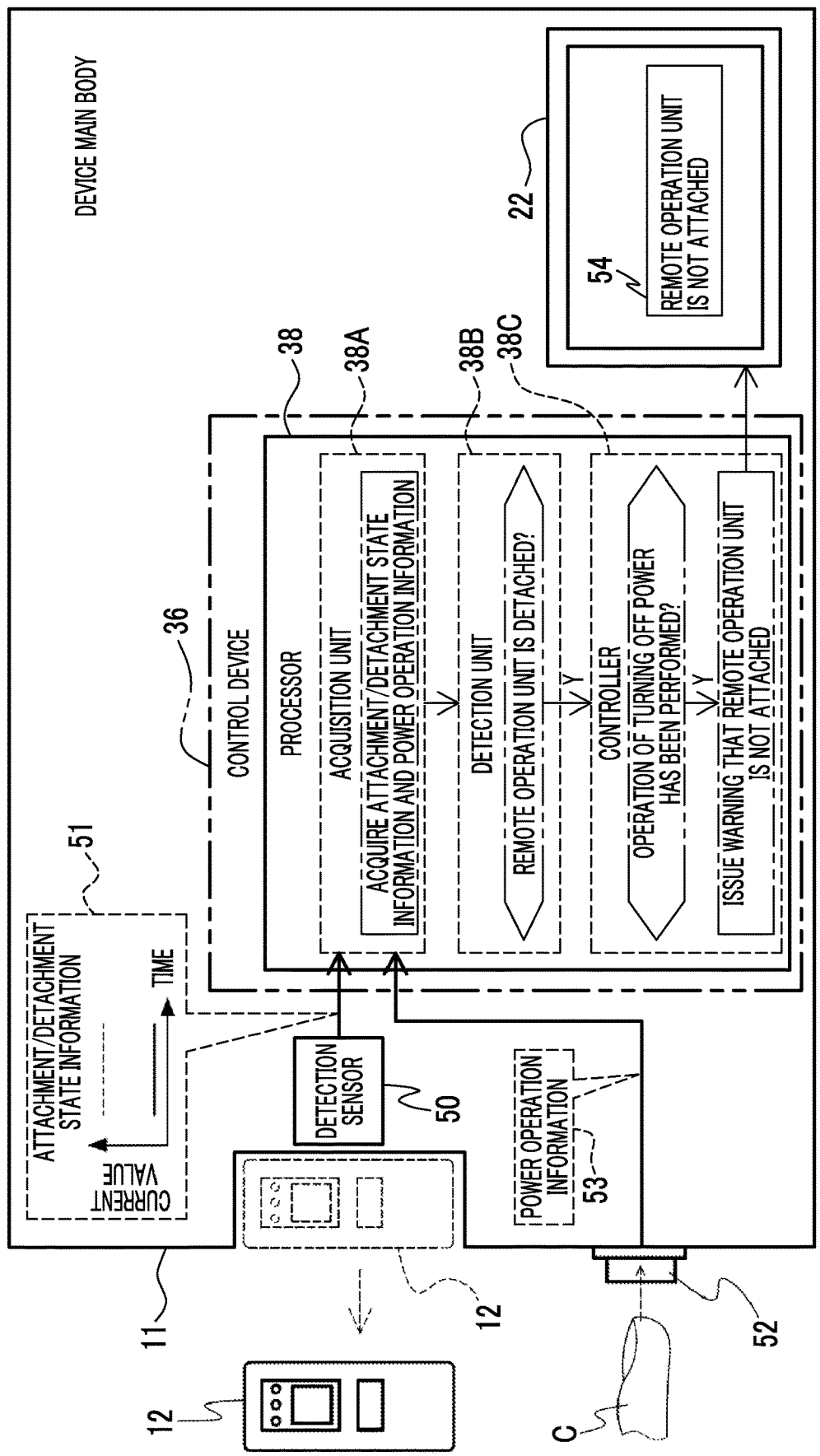
FIG. 6 is a conceptual diagram showing an example of contents of processing of an acquisition unit, a detection unit, and a controller.

As shown in FIG. 6 as an example, it is assumed that the remote operation unit 12 is detached from the device main body 11. In this case, the detection sensor 50 outputs a signal corresponding to a state in which the remote operation unit 12 is detached. That is, the detection sensor 50 outputs attachment/detachment state information 51. Here, the attachment/detachment state information 51 includes information indicating that the remote operation unit 12 is detached. In the example shown in FIG. 6, a current value that is a low value in a state in which the remote operation unit 12 is detached as compared with a current value before the remote operation unit 12 is detached is output as the attachment/detachment state information 51.

In a state in which the remote operation unit 12 is detached, the user operates a power button 52. For example, the power button 52 is pressed down by a finger C of the user. The power button 52 is a button for stopping or starting a function of the radiation irradiation device 10. In a case where the power button 52 is operated, power operation information 53 is output. The power operation information 53 is information indicating that an operation of stopping the function of the radiation irradiation device 10 is performed. For example, the operation of stopping the function of the radiation irradiation device 10 is an operation of turning off the power of the radiation irradiation device 10.

Although an example of a form in which the power button 52 is pressed down as the operation of turning off the power has been described here, this is merely an example. The power button 52 may be cursors, slide switches, or touch pads. In addition, the power button 52 may be a soft key displayed on the display 22.

Further, although an example of a form in which the operation of turning off the power of the radiation irradiation device 10 is performed has been described here, the technology of the present disclosure is not limited thereto. The technology of the present disclosure is established as long as an operation of partially stopping the functions of the radiation irradiation device 10 is performed in a state in which the remote operation unit 12 is detached. For example, in a state in which the remote operation unit 12 is detached, an operation of putting the radiation irradiation device 10 into a sleep state (for example, a state in which functions other than receiving the operation from the user are stopped) may be performed.

The acquisition unit 38A acquires the attachment/detachment state information 51 from the detection sensor 50. Further, the acquisition unit 38A acquires the power operation information 53 from the power button 52. Then, the acquisition unit 38A outputs the attachment/detachment state information 51 to the detection unit 38B.

The detection unit 38B detects the attachment/detachment state of the remote operation unit 12 with respect to the accommodation portion 24. Here, the attachment/detachment state includes a state in which the remote operation unit 12 is attached to the device main body 11 or a state in which the remote operation unit 12 is detached from the device main body 11. The detection unit 38B detects the attachment/detachment state based on the attachment/detachment state information 51 acquired from the acquisition unit 38A. For example, the detection unit 38B detects the attachment/detachment state by comparing the current value indicated by the attachment/detachment state information 51 with a predetermined value. Specifically, the detection unit 38B detects that the remote operation unit 12 is detached from the device main body 11 in a case where the current value indicated by the attachment/detachment state information 51 is lower than a predetermined value.

The controller 38C executes a control according to the attachment/detachment state detected by the detection unit 38B. For example, in a case where it is detected that the remote operation unit 12 is detached, the controller 38C acquires the power operation information 53 from the acquisition unit 38A. Then, the controller 38C determines whether or not an operation of turning off the power is performed based on the power operation information 53. In a case where determination is made that the operation of turning off the power is performed, the controller 38C executes a control to issue a warning that the remote operation unit 12 is not attached.

The controller 38C displays a warning message 54 on the display 22. Specifically, the controller 38C performs a graphical user interface (GUI) control for displaying the warning message 54 to display a screen including the warning message 54 on the display 22. In the example shown in FIG. 6, a text "Remote operation unit is not attached" is displayed on the display 22 as the warning message 54. The user can recognize the attachment/detachment state of the remote operation unit 12 by viewing the warning message 54 displayed on the display 22.

Although an example of a form in which the warning message 54 is displayed has been described here, this is merely an example. The content of the warning message 54 can be set as appropriate. In addition, a mark (for example, an exclamation mark) indicating that the remote operation unit 12 is detached may be displayed in place of the warning message 54 or together with the warning message 54.

As described above, in the radiation irradiation device 10 according to the first embodiment, in the processor 38, the attachment/detachment state of the remote operation unit 12 with respect to the accommodation portion 24 is detected by the detection unit 38B. Then, the controller 38C executes a control according to the detected attachment/detachment state. For example, in a case where the user has performed an operation of turning off the power and the remote operation unit 12 is detached, the controller 38C executes a control to notify the user that the remote operation unit 12 is detached. Thus, a need for the user to perform work for checking the attachment/detachment state of the remote operation unit 12 is reduced. In this way, by executing the control according to the attachment/detachment state, a need for the user to perform work according to the attachment/detachment state is reduced. As a result, the convenience of the radiation irradiation device is improved.

Further, for example, in a case where the use of the radiation irradiation device 10 is finished while the remote operation unit 12 is detached, there is a risk that the remote operation unit 12 may be lost in a case where the radiation irradiation device 10 is stored in a case or is carried. For example, in a case where the remote operation unit 12 and the device main body 11 perform wireless communication, since wired connection is not made, such loss is likely to occur. In the present configuration, since a control is executed according to the attachment/detachment state of the remote operation unit 12, the user easily recognizes the attachment/detachment state of the remote operation unit 12. Thus, loss of the remote operation unit 12 is suppressed.

Further, in the radiation irradiation device 10 according to the first embodiment, the display 22 is provided in the device main body 11. Then, the controller 38C causes the display 22 to give a notification regarding the attachment/detachment state. Thus, it is realized to make the user recognize the attachment/detachment state of the remote operation unit 12.

Further, in the radiation irradiation device 10 according to the first embodiment, the attachment/detachment state of the remote operation unit 12 is detected by the detection unit 38B. In a state in which the remote operation unit 12 is detached, the controller 38C determines whether an operation of stopping at least a part of the functions of the device main body 11 is performed. In a case where an operation of stopping at least a part of the functions of the device main body 11 is performed, the controller 38C causes the display 22 to display that the remote operation unit 12 is not attached to the accommodation portion 24. As a result, it is realized to make the user recognize that the remote operation unit 12 is not attached to the accommodation portion 24.

For example, in a case where at least a part of the functions of the device main body 11 is stopped (for example, the power is turned off or is put into a sleep state), the notification to the user may not be available and the user may not be able to grasp the attachment/detachment state of the remote operation unit 12. Accordingly, the user is made to recognize the attachment/detachment state of the remote operation unit 12 by notifying the user that the remote operation unit 12 is not attached to the accommodation portion 24 before the function of the device main body 11 is stopped.

Further, in the radiation irradiation device 10 according to the first embodiment, the operation of stopping at least a part of the functions of the device main body 11 is an operation of turning off the power of the device main body 11. In a case where an operation of turning off the power of the device main body 11 is performed while the remote operation unit 12 is detached, the controller 38C causes the display 22 to display that the remote operation unit 12 is not attached to the accommodation portion 24. As a result, it is realized to make the user recognize that the remote operation unit 12 is not attached to the accommodation portion 24.

In a case where the power of the device main body 11 is turned off, the notification to the user is not available, and the user cannot recognize the attachment/detachment state of the remote operation unit 12. Further, in a case where the power of the device main body 11 is turned off, there is a high probability that the use of the radiation irradiation device 10 is finished and the radiation irradiation device 10 is stored in the case as it is. Accordingly, before the power of the device main body 11 is turned off, the display 22 displays that the remote operation unit 12 is not attached to the accommodation portion 24. As a result, it is realized to make the user recognize that the remote operation unit 12 is not attached to the accommodation portion 24.

Further, in the radiation irradiation device 10 according to the first embodiment, the warning message 54 is displayed on the display 22 provided on the rear surface 11B of the device main body 11. Since the display 22 provided on the rear surface 11B of the device main body 11 indicates the attachment/detachment state of the remote operation unit 12, the user can easily recognize the attachment/detachment state.

For example, in a case where the display 22 is provided on the front surface 11A of the device main body 11, since the tubular portion 18 provided with an irradiation field limiter or the like is provided on the front surface 11A, a size of the display 22 cannot be sufficiently ensured. Meanwhile, since the tubular portion 18 is not provided on the rear surface 11B, the size of the display 22 can be ensured, which makes it easier for the user to recognize.

Further, for example, in a case where the display 22 is provided on the front surface 11A of the device main body 11, the tubular portion 18 comprising the irradiation field limiter or the like is provided on the front surface 11A. That is, the subject is irradiated with the radiation from the front surface 11A of the device main body 11. Therefore, in a case where the display 22 is provided on the front surface 11A, unintended exposure may occur in a case where the user checks the content of notification on the display 22. In the present configuration, since the display 22 is provided on the rear surface 11B, in a case where the user checks the content of the notification, erroneous exposure to the radiation is suppressed because the user is not located on a radiation irradiation side.

In the first embodiment, although an example of a form in which, in a case where the operation of turning off the power of the radiation irradiation device 10 is performed, a warning indicating that the remote operation unit 12 is not attached is issued has been described, the technology of the present disclosure is not limited thereto. For example, an aspect in which the attachment/detachment state of the remote operation unit 12 is constantly displayed on the display 22 may be employed. Specifically, in a case where the remote operation unit 12 is detached from the device main body 11, a message or an icon indicating that the remote operation unit 12 is detached may be displayed on the display 22. Then, in a case where the remote operation unit 12 is attached to the accommodation portion 24, the display of the messages or icon ends.

First Modification Example

In the first embodiment, although an example of a form in which the attachment/detachment state of the remote operation unit 12 is notified by the display 22 has been described, the technology of the present disclosure is not limited thereto. In the first modification example, the attachment/detachment state of the remote operation unit 12 is notified by a display lamp 56.

For example, as shown in FIG. 7, the device main body 11 comprises the display lamp 56. The display lamp 56 is provided on an upper surface 11D of the device main body 11 and protrudes outward from the upper surface 11D. The display lamp 56 is, for example, a display lamp using a light-emitting diode (LED) as a light source. The display lamp 56 is an example of a "display lamp" according to the technology of the present disclosure.

The detection sensor 50 outputs a signal corresponding to the attachment/detachment state of the remote operation unit 12 to the control device 36. In the control device 36, the controller 38C (see FIG. 4) controls the display lamp 56 based on the attachment/detachment state information 51 (see FIG. 5) output from the detection sensor 50. In the example shown in FIG. 7, in a case where the remote operation unit 12 is detached, the display lamp 56 is lit under the control of the control device 36. The user can recognize the attachment/detachment state of the remote operation unit 12 by viewing the lighting of the display lamp 56.

Here, although an example of a form in which the display lamp 56 is lit in a case where the remote operation unit 12 is detached, this is merely an example. The display lamp 56 may blink, or a color of the display lamp 56 may change depending on the attachment/detachment state (for example, in a case where the remote operation unit 12 is attached, the color is blue, and in a case where the remote operation unit 12 is detached, a red color is lit).

As described above, in the radiation irradiation device 10 according to the first modification example, the attachment/detachment state of the remote operation unit 12 is notified by the display lamp 56 protruding outward from the upper surface 11D of the device main body 11. Since the display lamp 56 protrudes from the upper surface 11D of the device main body 11, the user can easily recognize the attachment/detachment state of the remote operation unit 12.

In the first modification example, although an example of a form in which the display lamp 56 is provided on the upper surface 11D of the device main body 11 has been described, the technology of the present disclosure is not limited thereto. The display lamp 56 may be provided on the rear surface 11B of the device main body 11. In this case, since the display lamp 56 is provided on a side opposite to the radiation irradiation side, in a case where the user checks the content of the notification, erroneous exposure to the radiation is suppressed because the user is not located on the radiation irradiation side.

Further, in the first modification example, an example of a form in which the attachment/detachment state of the remote operation unit 12 is displayed by the display lamp 56 has been described, but this is merely an example. The display 22 may be provided together with the display lamp 56.

In the first embodiment and the first modification example, although an example of a form in which the attachment/detachment state is visually notified by the display 22 or the display lamp 56 has been described, the technology of the present disclosure is not limited thereto. For example, the attachment/detachment state may be notified by a voice through a speaker (not shown) provided in the device main body 11.

Second Embodiment

In the first embodiment, although an example of a form in which a notification to the user is performed depending on the attachment/detachment state of the remote operation unit 12 has been described, the technology of the present disclosure is not limited thereto. In the second embodiment, pairing between the remote operation unit 12 and the device main body 11 is started in a case where the remote operation unit 12 is attached.

Figure 8:
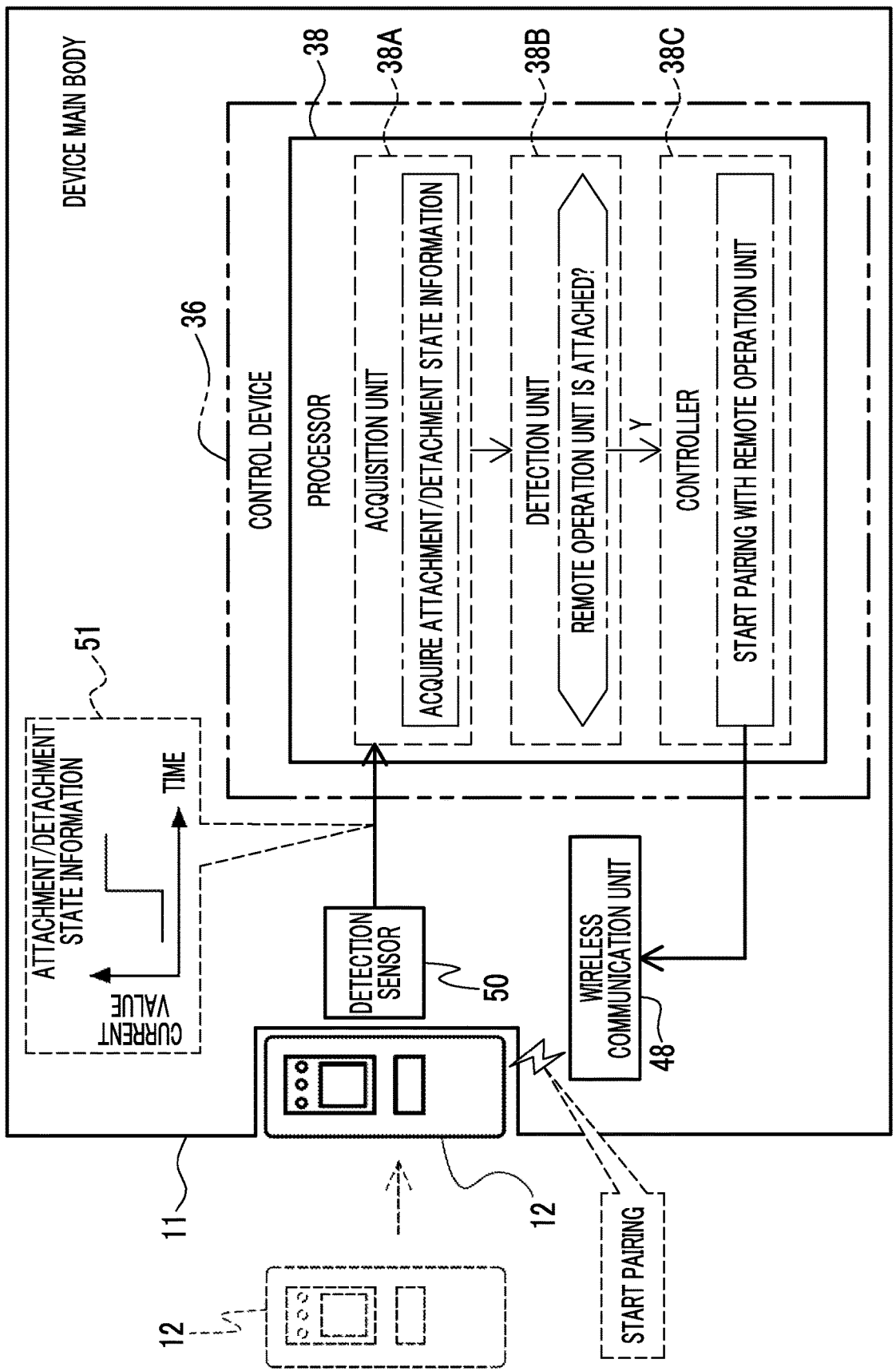
FIG. 8 is a conceptual diagram showing an example of contents of processing of the acquisition unit, the detection unit, and the controller.

As shown in FIG. 8 as an example, in a case where the remote operation unit 12 is attached to the device main body 11, the detection sensor 50 outputs attachment/detachment state information 51 to the acquisition unit 38A. Here, the attachment/detachment state information 51 includes information indicating that the remote operation unit 12 is attached. In the example shown in FIG. 8, a time-series change of a current value is output as the attachment/detachment state information 51. That is, a change of the current value from a relatively low value before the remote operation unit 12 is attached to a relatively high value after the remote operation unit 12 is attached is output as the attachment/detachment state information 51.

The detection unit 38B detects the attachment/detachment state based on the attachment/detachment state information 51 acquired from the acquisition unit 38A. For example, the detection unit 38B detects the attachment/detachment state by comparing the change of the current value indicated by the attachment/detachment state information 51 with a predetermined difference. Specifically, the detection unit 38B detects that the remote operation unit 12 is attached to the device main body 11 in a case where the change of the current value is a positive value larger than the predetermined difference.

In a case where it is detected that the remote operation unit 12 is attached, the controller 38C starts pairing between the remote operation unit 12 and the wireless communication unit 48 of the device main body 11 in a case where the pairing is necessary. Here, the pairing indicates communication between the wireless communication unit 48 and the remote operation unit 12 to cause them to be recognized as communication partners prior to wireless communication. After the pairing between the wireless communication unit 48 and the remote operation unit 12 is completed, wireless communication between the wireless communication unit 48 and the remote operation unit 12 is performed.

As described above, in the radiation irradiation device 10 according to the second embodiment, in a case where the remote operation unit 12 is attached to the device main body 11, the pairing between the remote operation unit 12 and the wireless communication unit 48 of the device main body 11 is started. Thus, the pairing between the remote operation unit 12 and the wireless communication unit 48 can be performed by a simple operation of attaching the remote operation unit 12 to the device main body 11. As a result, it is possible to reduce the labor for the operation of the user as compared with a case where the user starts the pairing through a setting screen.

Third Embodiment

In the first embodiment, although an example of a form in which a notification to the user is performed depending on the attachment/detachment state of the remote operation unit 12 has been described, the technology of the present disclosure is not limited thereto. In the third embodiment, a control related to the irradiation with the radiation is performed according to the attachment/detachment state of the remote operation unit 12.

Figure 9:
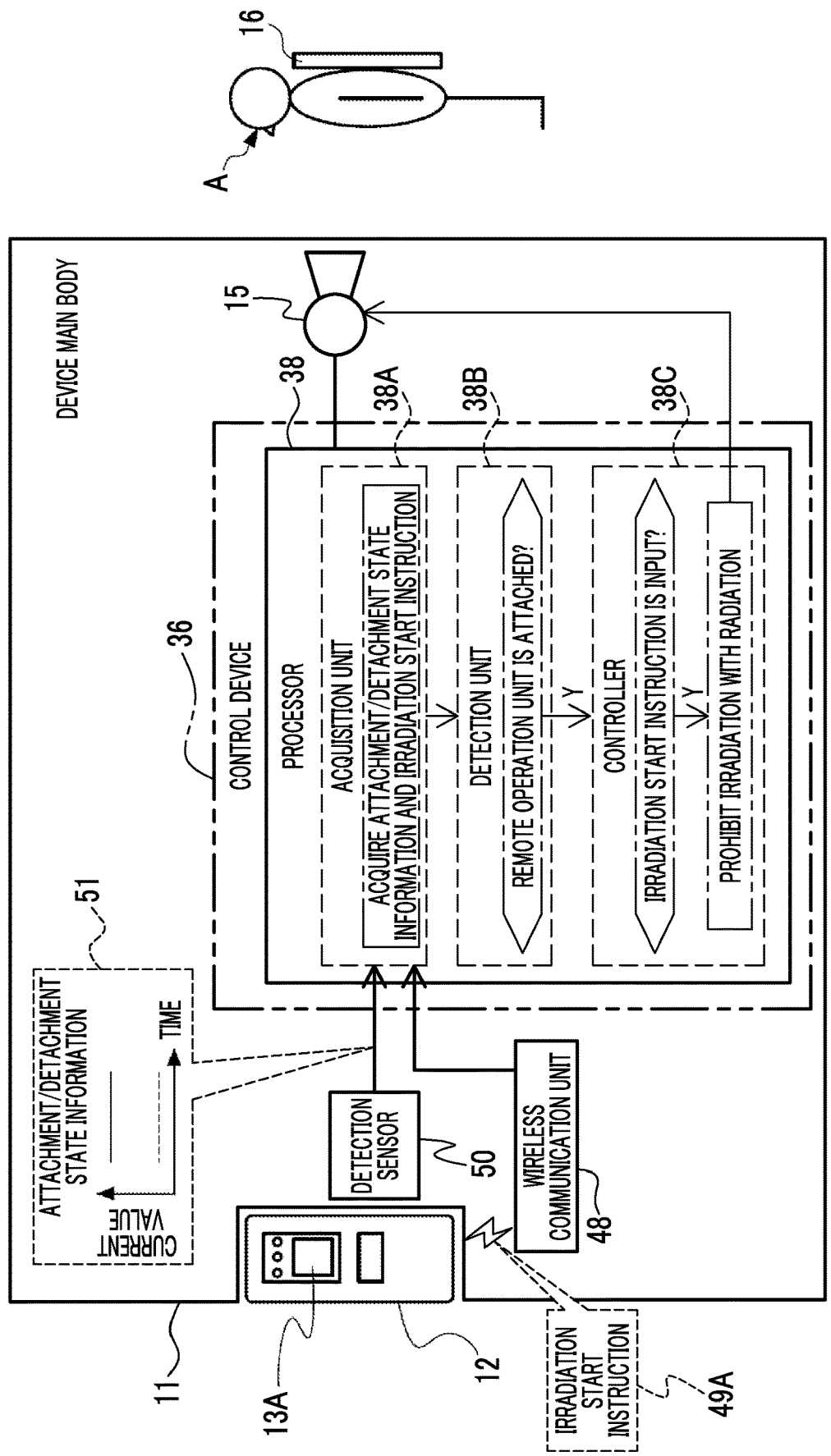
FIG. 9 is a conceptual diagram showing an example of contents of processing of the acquisition unit, the detection unit, and the controller.

As shown in FIG. 9 as an example, it is assumed that the remote operation unit 12 is attached to the device main body 11. In this case, the detection sensor 50 outputs a signal indicating a state in which the remote operation unit 12 is attached as the attachment/detachment state information 51. Here, the attachment/detachment state information 51 includes information indicating that the remote operation unit 12 is attached. In the example shown in FIG. 9, a current value that is a high value in a state in which the remote operation unit 12 is attached as compared with a current value before the remote operation unit 12 is attached is output as the attachment/detachment state information 51.

The irradiation button 13A is operated by the user in a state in which the remote operation unit 12 is attached. In a case where the irradiation button 13A is operated, the irradiation start instruction 49A is transmitted from the remote operation unit 12 to the wireless communication unit 48. The wireless communication unit 48 outputs the received irradiation start instruction 49A to the acquisition unit 38A.

The acquisition unit 38A acquires the attachment/detachment state information 51 from the detection sensor 50. In addition, the acquisition unit 38A acquires the irradiation start instruction 49A from the wireless communication unit 48. Then, the acquisition unit 38A outputs the attachment/detachment state information 51 to the detection unit 38B.

The detection unit 38B detects the attachment/detachment state of the remote operation unit 12 with respect to the accommodation portion 24. Here, the attachment/detachment state includes a state in which the remote operation unit 12 is attached to the device main body 11. For example, the detection unit 38B detects that the remote operation unit 12 is attached to the device main body 11 in a case where a current value indicated by the attachment/detachment state information 51 is higher than a predetermined value.

In a case where the detection unit 38B detects that the remote operation unit 12 is attached, the controller 38C acquires the irradiation start instruction 49A from the acquisition unit 38A. In a case where the irradiation start instruction 49A is input, the controller 38C prohibits the irradiation with the radiation. Specifically, in a case where the irradiation start instruction 49A is input, the controller 38C stops supplying power, which is used for irradiation with the radiation, to the radiation tube 15. Accordingly, in a case where the remote operation unit 12 is attached to the device main body 11, the subject A is not irradiated with radiation.

As described above, in the radiation irradiation device 10 according to the third embodiment, in the processor 38, in a case where the irradiation start instruction 49A is input from the remote operation unit 12, the controller 38C performs a control related to the irradiation with the radiation according to the attachment/detachment state of the remote operation unit 12. Accordingly, since the need to perform the work by the user is reduced as compared with a case where the user checks the attachment/detachment state of the remote operation unit 12 and starts the irradiation with the radiation, the convenience of the radiation irradiation device 10 is improved.

Further, in the radiation irradiation device 10 according to the third embodiment, in the processor 38, in a case where the irradiation start instruction 49A is input from the remote operation unit 12, the controller 38C prohibits the irradiation with radiation in a case where the remote operation unit 12 is attached. Thus, it is possible to suppress the irradiation with the radiation that is not intended by the user, such as the irradiation with the radiation in a state in which the user is close to the device main body 11.

For example, a state in which the remote operation unit 12 is attached to the device main body 11 means that the user who operates the remote operation unit 12 is at a position close to the device main body 11. In a case where the radiation is emitted in this state, there is a risk that the irradiation with the radiation which is not intended by the user may occur, for example, the user who is located close to the device main body 11 may be exposed to the radiation to some extent. In the present configuration, in a case where the remote operation unit 12 is attached to the device main body 11, the irradiation with the radiation is prohibited by the controller 38C even in a case where the irradiation start instruction 49A is received. Therefore, the irradiation with the radiation unintended by the user is suppressed.

Second Modification Example

In the third embodiment, although an example of a form in which the irradiation with the radiation is prohibited as the control according to the attachment/detachment state of the remote operation unit 12 has been described, the technology of the present disclosure is not limited thereto. In the second modification example, a control of issuing a warning as to whether the irradiation with the radiation is allowed is performed.

Figure 10:
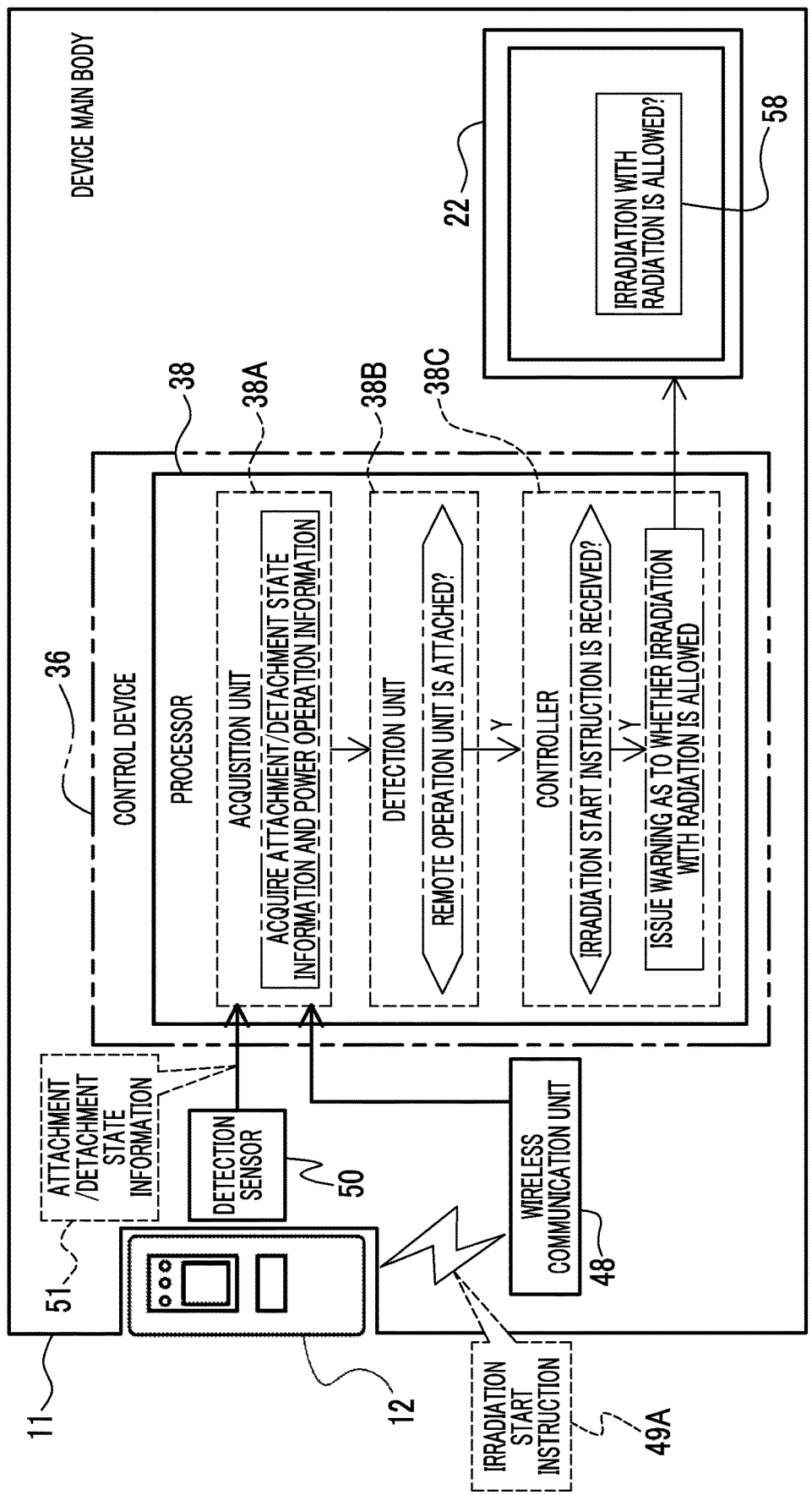
FIG. 10 is a conceptual diagram showing an example of contents of processing of the acquisition unit, the detection unit, and the controller.

As shown in FIG. 10 as an example, the acquisition unit 38A acquires the attachment/detachment state information 51 from the detection sensor 50. In addition, the acquisition unit 38A acquires the irradiation start instruction 49A from the wireless communication unit 48. Then, the acquisition unit 38A outputs the attachment/detachment state information 51 to the detection unit 38B.

In a case where the detection unit 38B detects that the remote operation unit 12 is attached, the controller 38C acquires the irradiation start instruction 49A from the acquisition unit 38A. In a case where the irradiation start instruction 49A is input, the controller 38C issues a warning as to whether the irradiation with the radiation is allowed. Specifically, in a case where the irradiation start instruction 49A is received, the controller 38C displays a warning message 58 on the display 22. In the example shown in FIG. 10, an example is shown in which a text "Irradiation with radiation is allowed?" is displayed as the warning message 58. Thus, in a case where the remote operation unit 12 is attached to the device main body 11, it is realized to check whether the user is allowed to be irradiated with the radiation.

As described above, in the radiation irradiation device 10 according to the second modification example, in the processor 38, in a case where the irradiation start instruction 49A is input from the remote operation unit 12, the controller 38C issues a warning as to whether the irradiation with the radiation is allowed in a case where the remote operation unit 12 is attached. The user can determine whether to perform or interrupt the irradiation with the radiation after checking the warning content. Accordingly, it is possible to suppress the irradiation with the radiation that is not intended by the user.

For example, a state in which the remote operation unit 12 is attached to the device main body 11 means that the user who operates the remote operation unit 12 is at a position close to the device main body 11. In a case where the radiation is emitted in this state, there is a risk that the irradiation with the radiation which is not intended by the user may occur, for example, the user who is located close to the device main body 11 may be exposed to the radiation to some extent. In the present configuration, in a case where the remote operation unit 12 is attached to the device main body 11, a warning is issued as to whether the irradiation with the radiation is allowed in a case where the irradiation start instruction 49A is received. As a result, the irradiation with the radiation that is not intended by the user is suppressed.

Third Modification Example

In the third embodiment, although an example of a form in which the irradiation with the radiation is prohibited as the control according to the attachment/detachment state of the remote operation unit 12 has been described, the technology of the present disclosure is not limited thereto. In the third modification example, a control of permitting the irradiation with the radiation is performed.

Figure 11:
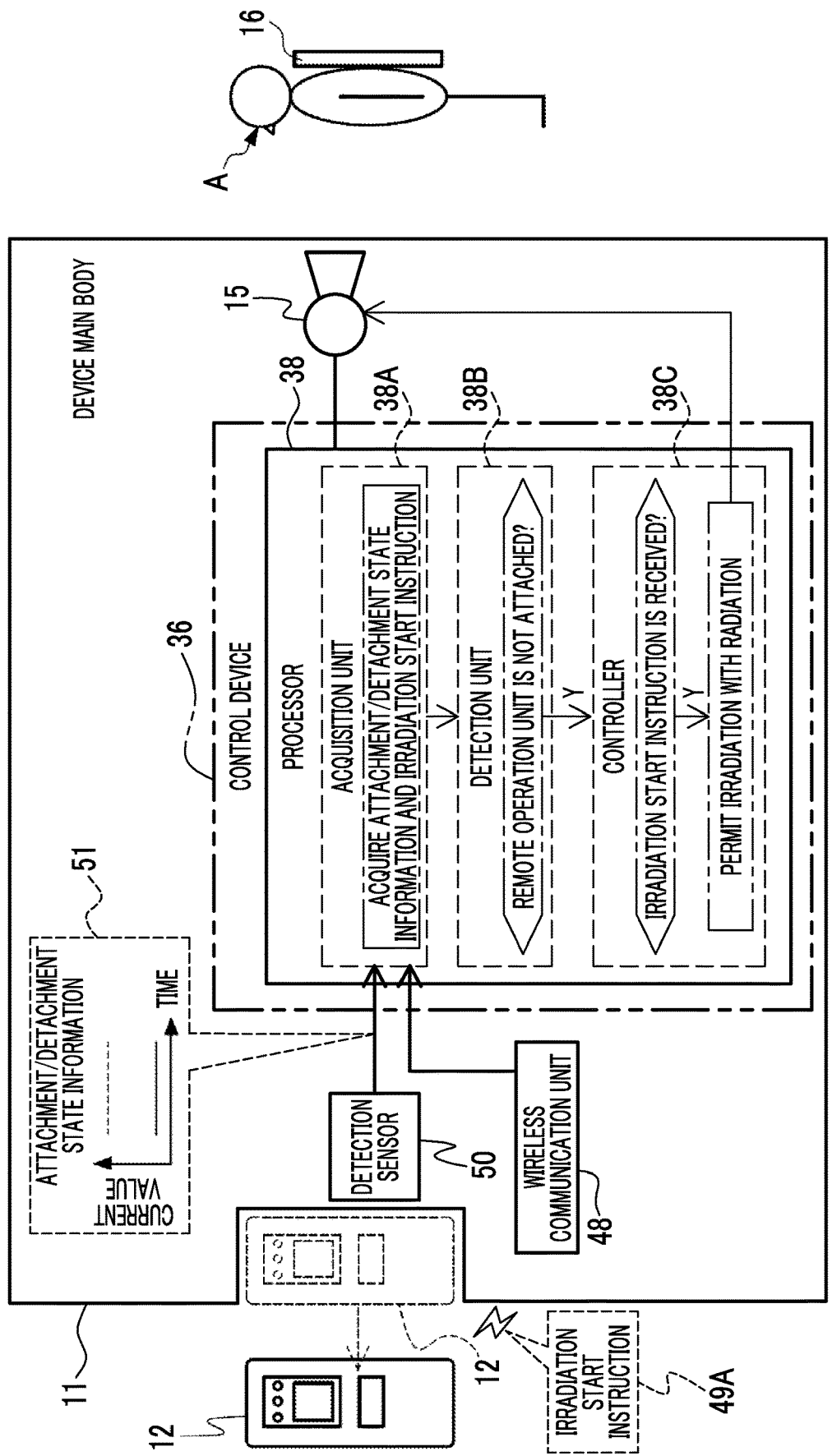
FIG. 11 is a conceptual diagram showing an example of contents of processing of the acquisition unit, the detection unit, and the controller.

As shown in FIG. 11 as an example, in a case where the remote operation unit 12 is detached from the device main body 11, the detection sensor 50 outputs the attachment/detachment state information 51. In the example shown in FIG. 11, a current value that is a low value in a state in which the remote operation unit 12 is detached as compared with a current value before the remote operation unit 12 is detached is output as the attachment/detachment state information 51.

The acquisition unit 38A acquires the attachment/detachment state information 51 from the detection sensor 50. In addition, the acquisition unit 38A acquires the irradiation start instruction 49A from the wireless communication unit 48. Then, the acquisition unit 38A outputs the attachment/detachment state information 51 to the detection unit 38B.

In a case where the detection unit 38B detects that the remote operation unit 12 is detached, the controller 38C acquires the irradiation start instruction 49A from the acquisition unit 38A. In a case where the irradiation start instruction 49A is input, the controller 38C performs a control to permit the irradiation with the radiation. Specifically, the controller 38C controls the radiation tube 15 such that the radiation R is emitted with a predetermined tube voltage, tube current, and irradiation time based on the irradiation start instruction 49A.

As described above, in the radiation irradiation device 10 according to the third modification example, in the processor 38, in a case where the irradiation start instruction 49A is input from the remote operation unit 12, the controller 38C permits the irradiation with the radiation in a case where the remote operation unit 12 is detached. Accordingly, it is possible to suppress the irradiation with the radiation that is not intended by the user.

For example, a state in which the remote operation unit 12 is detached from the device main body 11 means that the user is at a position sufficiently separated from the device main body 11. In this state, even in a case where the radiation is emitted, an influence on the user is small. In the present configuration, in a case where the remote operation unit 12 is detached, the irradiation with the radiation is permitted. As a result, the irradiation with the radiation that is not intended by the user is suppressed.

Fourth Modification Example

In the third embodiment, although an example of a form in which the irradiation with the radiation is prohibited as the control according to the attachment/detachment state of the remote operation unit 12 has been described, the technology of the present disclosure is not limited thereto. In the fourth modification example, a control of starting preparation for the irradiation with the radiation is performed.

Figure 12:
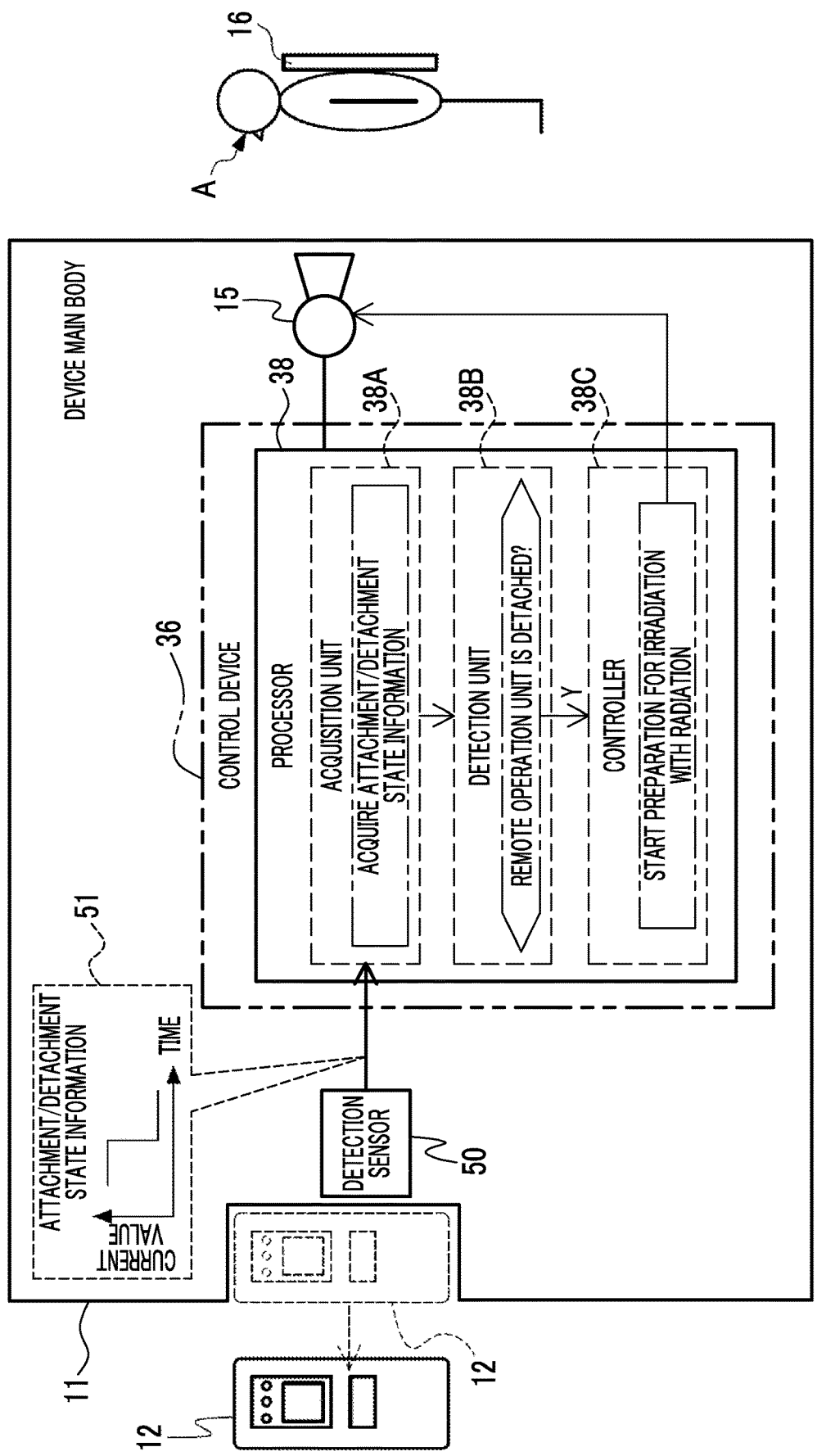
FIG. 12 is a conceptual diagram showing an example of contents of processing of the acquisition unit, the detection unit, and the controller.

As shown in FIG. 12 as an example, in a case where the remote operation unit 12 is detached from the device main body 11, the detection sensor 50 outputs attachment/detachment state information 51 to the acquisition unit 38A. Here, the attachment/detachment state information 51 includes information indicating that the remote operation unit 12 is detached. In the example shown in FIG. 12, a change of the current value from a relatively high value before the remote operation unit 12 is detached to a relatively low value after the remote operation unit 12 is detached is output as the attachment/detachment state information 51.

The detection unit 38B detects the attachment/detachment state based on the attachment/detachment state information 51 acquired from the acquisition unit 38A. Specifically, the detection unit 38B detects that the remote operation unit 12 is detached from the device main body 11 in a case where the change of the current value is a negative value smaller than the predetermined difference.

In a case where the detection unit 38B detects that the remote operation unit 12 is attached, the controller 38C starts preparation for the irradiation with the radiation. Specifically, the controller 38C causes a driving unit (not shown) to start a preparation operation. Here, the driving unit includes, for example, a high-voltage generation unit (not shown) which generates a high voltage to be applied to the radiation tube 15. The preparation operation includes an operation of causing a transformer of the high-voltage generation unit to start boosting. Further, in a case where the radiation tube 15 has a filament (not shown) that emits thermionic electrons as a cathode, the preparation operation includes an operation of causing a current to flow through the filament to heat the filament, and the like.

As described above, in the radiation irradiation device 10 according to the fourth modification example, in the processor 38, the controller 38C starts preparation for the irradiation with the radiation in a case where the remote operation unit 12 is detached. Therefore, a time required to prepare for the irradiation with the radiation is shortened, which improves the convenience of the radiation irradiation device 10.

As a matter of course, the various controls executed by the controller 38C described in the first to third embodiments may be executed in combination. That is, the controls described in the first to third embodiments may be appropriately selected and executed depending on the attachment/detachment state. In addition, the user may be able to select in advance which of the controls described in the first to third embodiments is to be performed.

Fourth Embodiment

In the first embodiment to the third embodiment and each modification example, although an example of a form in which a signal corresponding to the attachment/detachment state of the remote operation unit 12 is output by the detection sensor 50 has been described, the technology of the present disclosure is not limited thereto. In the fourth embodiment, a distance between the device main body 11 and the remote operation unit 12 (hereinafter, also simply referred to as a "communication distance") is derived based on a signal intensity received by wireless communication with the remote operation unit 12, and further, the attachment/detachment state is detected based on the communication distance.

Figure 13:
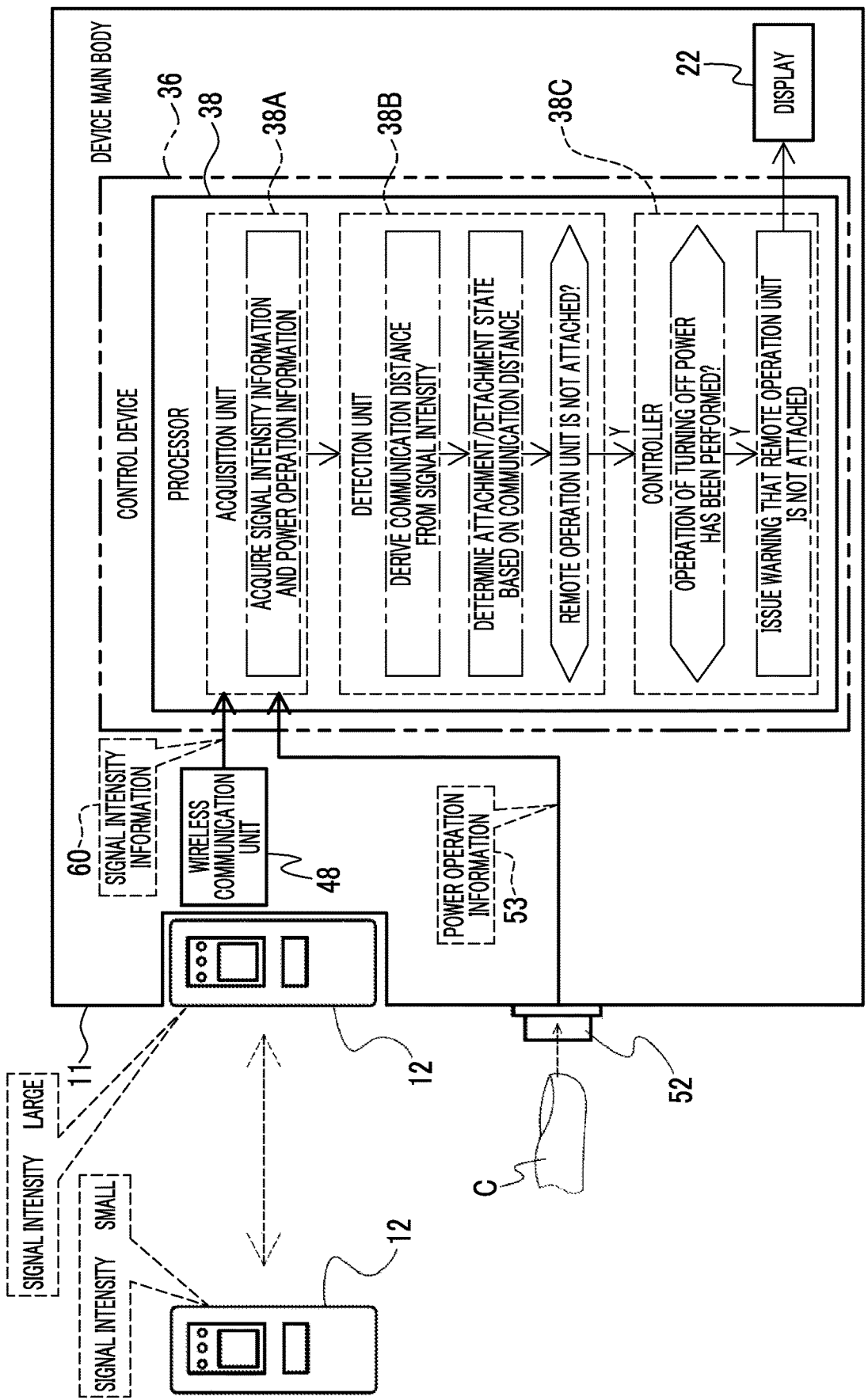
FIG. 13 is a conceptual diagram showing an example of contents of processing of the acquisition unit, the detection unit, and the controller.

As shown in FIG. 13 as an example, the wireless communication unit 48 performs wireless communication with the remote operation unit 12. The wireless communication unit 48 outputs signal intensity information 60 that is information indicating the signal intensity received by wireless communication. Here, the signal intensity in wireless communication varies depending on the communication distance. That is, the signal intensity is relatively large in a case where the remote operation unit 12 and the device main body 11 are close to each other, and the signal intensity is relatively small in a case where the remote operation unit 12 and the device main body 11 are spaced apart from each other.

The acquisition unit 38A acquires the signal intensity information 60 from the wireless communication unit 48. Further, the acquisition unit 38A acquires the power operation information 53 from the power button 52. Moreover, the acquisition unit 38A outputs the signal intensity information 60 to the detection unit 38B.

The detection unit 38B derives the communication distance based on the signal intensity of wireless communication between the remote operation unit 12 and the wireless communication unit 48. For example, the detection unit 38B derives the communication distance by using a distance derivation table (not shown). The distance derivation table is a table in which the signal intensity is used as an input value and the communication distance is used as an output value. The detection unit 38B uses the distance derivation table to derive the communication distance according to the signal intensity and outputs the communication distance to the controller 38C.

Here, although an example in which the communication distance is derived using the distance derivation table has been described, this is merely an example, and a distance calculation expression may be used. The distance calculation expression is a calculation expression in which the signal intensity is used as an independent variable and the communication distance is used as a dependent variable.

Then, the detection unit 38B detects the attachment/detachment state of the remote operation unit 12 based on the derived communication distance. For example, the detection unit 38B determines the attachment/detachment state of the remote operation unit 12 by comparing a predetermined value with the communication distance. Specifically, the detection unit 38B detects that the remote operation unit 12 is not attached to the device main body 11 in a case where the derived communication distance is equal to or longer than a predetermined value (for example, 5 m).

In a case where it is detected that the remote operation unit 12 is not attached, the controller 38C acquires the power operation information 53 from the acquisition unit 38A. Then, the controller 38C determines whether or not an operation of turning off the power is performed based on the power operation information 53. In a case where determination is made that the operation of turning off the power is performed, the controller 38C executes a control to issue a warning that the remote operation unit 12 is not attached. The controller 38C displays a warning message 54 on the display 22. The user can recognize the attachment/detachment state of the remote operation unit 12 by viewing the warning message 54 (see FIG. 6) displayed on the display 22.

As described above, in the radiation irradiation device 10 according to the fourth embodiment, in the processor 38, the detection unit 38B detects the attachment/detachment state of the remote operation unit 12 based on the communication distance which is based on the signal intensity obtained by wireless communication with remote operation unit 12. Accordingly, it is realized to detect the attachment/detachment state without separately providing a sensor for detecting the attachment/detachment state. Therefore, the configuration of the radiation irradiation device 10 is simplified.

In the above embodiment, although an example of a form in which the inner wall surface 34 faces all surfaces other than the back surface 12B of the remote operation unit 12 in a state in which the remote operation unit 12 is accommodated in the accommodation portion 24 has been described, the technology of the present disclosure is not limited thereto. For example, an aspect in which the operation surface 12A of the remote operation unit 12 is exposed in a state in which the remote operation unit 12 is accommodated in the accommodation portion 24 may be employed. In addition, an aspect in which a plurality of surfaces of the remote operation unit 12 are exposed in a state in which the remote operation unit 12 is accommodated in the accommodation portion 24 may be employed. That is, an aspect in which the accommodation portion 24 is formed by cutting out a corner portion of the device main body 11 and the remote operation unit 12 is attached to the accommodation portion 24 via two surfaces of the remote operation unit 12 may be employed.

Further, as long as the remote operation unit 12 is attachable to and detachable from the device main body 11, the technology of the present disclosure is established. For example, an aspect in which the remote operation unit 12 is attached to an outer peripheral surface of the device main body 11 via one surface of the remote operation unit 12 or an aspect in which a part of the remote operation unit 12 is hooked on a hook provided on the device main body 11 may be employed.

In the above embodiment, an example of a form in which the remote operation unit 12 and the device main body 11 perform wireless communication has been described, but the technology of the present disclosure is not limited thereto. The remote operation unit 12 and the device main body 11 may perform wired communication.

Moreover, in the above embodiment, an example of a form in which the control program 40A is stored in the storage 40 has been described, but the technology of the present disclosure is not limited thereto. For example, the control program 40A may be stored in a storage medium (not shown), such as an SSD or a universal serial bus (USB) memory. The storage medium is a portable computer-readable non-transitory storage medium. The control program 40A stored in the storage medium is installed in the radiation irradiation device 10. The processor 38 executes processing in accordance with the control program 40A.

Further, the control program 40A may be stored in a storage device of another computer, a server, or the like that is connected to the radiation irradiation device 10 via the network, and the control program 40A may be downloaded according to a request of the radiation irradiation device 10 and may be installed in the radiation irradiation device 10. That is, the program (program product) described in the present embodiment may be provided by the recording medium or in a form of being distributed from an external computer.

Moreover, in the above embodiment, although the processor 38, the storage 40, the RAM 42, and the external I/F 44 of the radiation irradiation device 10 are illustrated as a computer, the technology of the present disclosure is not limited thereto, and instead of the computer, a device including an application specific integrated circuit (ASIC), a field-programmable gate array (FPGA), and/or a programmable logic device (PLD) may be applied. Moreover, a hardware configuration and a software configuration may be used in combination, instead of the computer.

The following various processors can be used as hardware resources for executing the processing described in the above embodiment. Examples of the processor include a CPU which is a general-purpose processor functioning as the hardware resource for executing the processing by executing software, that is, a program. In addition, examples of the processor include a dedicated electric circuit which is a processor having a circuit configuration specially designed for executing specific processing, such as an FPGA, a PLD, or an ASIC. A memory is incorporated in or connected to any processor, and any processor uses the memory to execute the processing.

The hardware resource for executing the processing may be configured by one of these various processors, or may be configured by a combination (for example, a combination of a plurality of FPGAs or a combination of a CPU and an FPGA) of two or more processors of the same type or different types. Further, the hardware resource for executing the processing may be one processor.

As an example in which the hardware resource is configured with one processor, first, there is a form in which one processor is configured with a combination of one or more CPUs and software, and the processor functions as the hardware resource for executing the processing. Second, there is a form in which a processor that realizes functions of the entire system including a plurality of hardware resources for executing the processing with one integrated circuit (IC) chip is used, as typified by a system-on-a-chip (SoC). In this way, the processing is realized by using one or more of the various processors described above, as the hardware resource.

As a hardware structure of these various processors, more specifically, it is possible to use an electric circuit in which circuit elements, such as semiconductor elements, are combined. In addition, the image processing is merely an example. Therefore, it is needless to say that unnecessary steps may be deleted, new steps may be added, or a processing order may be changed without departing from the gist.

The above-described contents and illustrated contents are detailed descriptions of parts related to the technology of the present disclosure, and are merely examples of the technology of the present disclosure. For example, the above descriptions related to configurations, functions, operations, and advantageous effects are descriptions related to examples of configurations, functions, operations, and advantageous effects of the parts related to the technology of the present disclosure. Therefore, it is needless to say that unnecessary parts may be deleted, or new elements may be added or replaced with respect to the above-described contents and illustrated contents within a scope not departing from the spirit of the technology of the present disclosure. In order to avoid complication and easily understand the parts according to the technology of the present disclosure, in the above-described contents and illustrated contents, common technical knowledge and the like that do not need to be described to implement the technology of the present disclosure are not described.

All documents, patent applications, and technical standards described in the present specification are incorporated in the present specification by reference to the same extent as in a case where each document, patent application, and technical standard are specifically and individually noted to be incorporated by reference.

Furthermore, the following appendices will be disclosed in relation to the above-described embodiment.

Appendix 1

A radiation irradiation device comprising: a device main body that emits radiation; a remote operation unit that is capable of remotely operating the device main body and is attachable to and detachable from the device main body; and a processor, in which the processor is configured to: detect an attachment/detachment state of the remote operation unit with respect to the device main body; and execute a control of an operation of the device main body according to the detected attachment/detachment state.

Appendix 2

The radiation irradiation device according to Appendix 1, in which the device main body includes a notification unit that gives a notification to a user, and the control includes causing the notification unit to give a notification regarding the attachment/detachment state.

Appendix 3

The radiation irradiation device according to Appendix 2, in which the control includes causing the notification unit to give a notification that the remote operation unit is not attached to the device main body in a case where an operation of stopping at least a part of functions of the device main body is performed in a state in which the remote operation unit is detached from the device main body.

Appendix 4

The radiation irradiation device according to Appendix 3, in which the operation of stopping at least a part of the functions of the device main body is an operation of turning off a power of the device main body.

Appendix 5

The radiation irradiation device according to any one of Appendices 2 to 4, in which in a case where a surface of the device main body on which an irradiation window for emitting the radiation is provided is assumed as a front surface, the notification unit is a display provided on a rear surface which is a surface of the device main body opposite to the front surface.

Appendix 6

The radiation irradiation device according to any one of Appendices 2 to 4, in which the notification unit is a display lamp that protrudes outward from an outer peripheral surface of the device main body.

Appendix 7

The radiation irradiation device according to any one of Appendices 1 to 6, in which in a case where pairing for causing the device main body and the remote operation unit to be recognized as communication partners is necessary prior to wireless communication, the control includes starting the pairing in a case where it is determined that the remote operation unit is attached to the device main body.

Appendix 8

The radiation irradiation device according to any one of Appendices 1 to 7, in which the processor is configured to, in a case where an irradiation start instruction that is an instruction to start irradiation with the radiation is input from the remote operation unit, execute, as the control, a control related to the irradiation.

Appendix 9

The radiation irradiation device according to Appendix 8, in which the control related to the irradiation includes prohibiting the irradiation with the radiation by the device main body or issuing a warning as to whether the irradiation with the radiation is allowed in a case where the remote operation unit is attached to the device main body.

Appendix 10

The radiation irradiation device according to Appendix 8 or 9, in which the control related to the irradiation includes permitting the irradiation with the radiation by the device main body in a case where the remote operation unit is detached from the device main body.

Appendix 11

The radiation irradiation device according to any one of Appendices 1 to 10, in which the control includes starting preparation for irradiation with the radiation in a case where the remote operation unit is detached from the device main body.

Appendix 12

The radiation irradiation device according to any one of Appendices 1 to 11, in which the processor is configured to: derive a communication distance between the remote operation unit and the device main body based on a signal intensity received from the remote operation unit through wireless communication; and detect the attachment/detachment state based on the derived communication distance.

What is claimed is:

1. A radiation irradiation device comprising:
a device main body that emits radiation;
a remote operation unit that is capable of remotely operating the device main body and is attachable to and detachable from the device main body; and
a processor that is configured to:
  detect an attachment/detachment state of the remote operation unit with respect to the device main body; and
  execute a control of an operation of the device main body according to the detected attachment/detachment state.

2. The radiation irradiation device according to claim 1, wherein the device main body includes a notification unit that gives a notification to a user, and
the control includes causing the notification unit to give a notification regarding the attachment/detachment state.

3. The radiation irradiation device according to claim 2, wherein the control includes causing the notification unit to give a notification that the remote operation unit is not attached to the device main body in a case where an operation of stopping at least a part of functions of the device main body is performed in a state in which the remote operation unit is detached from the device main body.

4. The radiation irradiation device according to claim 3, wherein the operation of stopping at least a part of the functions of the device main body is an operation of turning off a power of the device main body.

5. The radiation irradiation device according to claim 2, wherein in a case where a surface of the device main body on which an irradiation window for emitting the radiation is provided is assumed as a front surface, the notification unit is a display provided on a rear surface which is a surface of the device main body opposite to the front surface.

6. The radiation irradiation device according to claim 2, wherein the notification unit is a display lamp that protrudes outward from an outer peripheral surface of the device main body.

7. The radiation irradiation device according to claim 1, wherein in a case where pairing for causing the device main body and the remote operation unit to be recognized as communication partners is necessary prior to wireless communication,
the control includes starting the pairing in a case where it is determined that the remote operation unit is attached to the device main body.

8. The radiation irradiation device according to claim 1, wherein the processor is configured to, in a case where an irradiation start instruction that is an instruction to start irradiation with the radiation is input from the remote operation unit, execute, as the control, a control related to the irradiation.

9. The radiation irradiation device according to claim 8, wherein the control related to the irradiation includes prohibiting the irradiation with the radiation by the device main body or issuing a warning as to whether the irradiation with the radiation is allowed in a case where the remote operation unit is attached to the device main body.

10. The radiation irradiation device according to claim 8, wherein the control related to the irradiation includes permitting the irradiation with the radiation by the device main body in a case where the remote operation unit is detached from the device main body.

11. The radiation irradiation device according to claim 1, wherein the control includes starting preparation for irradiation with the radiation in a case where the remote operation unit is detached from the device main body.

12. The radiation irradiation device according to claim 1, wherein the processor is configured to:
derive a communication distance between the remote operation unit and the device main body based on a signal intensity received from the remote operation unit through wireless communication; and
detect the attachment/detachment state based on the derived communication distance.

* * * * *